United States Patent [19]
Yokoyama et al.

[11] Patent Number: 5,760,885
[45] Date of Patent: Jun. 2, 1998

[54] LIGHT-SENSING DEVICE

[75] Inventors: Osamu Yokoyama; Takeo Kaneko, both of Suwa, Japan

[73] Assignee: Seiko Epson Corporation, Tokyo, Japan

[21] Appl. No.: 568,471

[22] Filed: Dec. 7, 1995

[30]  Foreign Application Priority Data

Dec. 4, 1994 [JP] Japan .................................. 6-310991
Aug. 30, 1995 [JP] Japan .................................. 7-245415

[51] Int. Cl.⁶ .................................................. G01C 3/08
[52] U.S. Cl. .................................................. 356/4.01
[58] Field of Search ........................... 356/4.01, 3.11, 356/141.2, 141.1, 141.5, 563

[56]  References Cited

U.S. PATENT DOCUMENTS

| | | | |
|---|---|---|---|
| 3,822,930 | 7/1974 | Douklias | 350/162 R |
| 5,163,319 | 11/1992 | Spies et al. | 356/371 X |
| 5,189,679 | 2/1993 | Derry et al. | |
| 5,313,262 | 5/1994 | Leonard | |
| 5,552,893 | 9/1996 | Akasu | 356/5.01 |

FOREIGN PATENT DOCUMENTS

| | | |
|---|---|---|
| A-0 384 353 | 8/1990 | European Pat. Off. |
| A-0 670 618 | 9/1995 | European Pat. Off. |
| A-2 691 117 | 11/1993 | France |
| A-4 028 789 | 3/1992 | Germany |
| A-61-149919 | 7/1986 | Japan |
| A-63-199310 | 8/1988 | Japan |
| A-5-190976 | 7/1993 | Japan |
| A-6-118161 | 4/1994 | Japan |
| WO 93/11448 | 6/1993 | WIPO |

OTHER PUBLICATIONS

"OPTICS", Hecht and Zajac, pp. 354–357, 1979.
Patent Abstracts of Japan, vol. 10, No. 351 (P-520), Aug. 7, 1986, Tsugito Maruyama et al.; "Slit Light Source" (JP-A-61-149919).
Patent Abstracts of Japan, vol. 12, No. 483 (P-802), Aug. 17, 1988, Koji Kamisaka, "Lens" (JP-A-63-199301).
Patent Abstracts of Japan, vol. 17, No. 615 (E-1459), Jul. 30, 1993, Tatsuya Asaga, "semiconductor Laser", (JP-A-5-190976).

*Primary Examiner*—Mark Hellner
*Attorney, Agent, or Firm*—Oliff & Berridge, PLC

[57]  ABSTRACT

A light-sensing device comprises a light source consisting of a semiconductor laser, a light-transmitting optical system having a lens surface and a diffraction grating surface arranged on the optical axis of light emitted from this light source, and a light-receiving detection system that detects any of the emitted light that is reflected from an object to be inspected. This emitted light is diffracted in at least two intersecting directions by the diffraction grating surface.

17 Claims, 18 Drawing Sheets

LIGHT-SENSING DEVICE

BACKGROUND OF THE INVENTION

1. Field of the Invention

The present invention relates to a light-sensing device that shines light onto an object to be inspected, then obtains information concerning the object to be inspected from light reflected therefrom.

2. Description of Prior Art

An example of a light-sensing device is disclosed in Japanese Patent Application Laid-Open No 6-118161. This light-sensing device is designed to measure the distance to an object to be inspected, and a diffraction grating is used to enable control over the shape of the optical pattern shone at the object to be inspected.

However, the diffraction grating used by this light-sensing device is a one-dimensional component, and thus the light diffracted thereby is configured to be generated in only one direction (assume that this is called the X direction). Assume that an illumination width of W1 is necessary in a near-distance region in front of the light source and an illumination width of W2 is necessary in a far-distance region, in a direction in which diffracted light is not generated (such as the Y direction). If the illumination width is adjusted for one of the near-distance region and the far-distance region, it could happen that it will not be possible to ensure the illumination width or intensity of the light in the other region.

There have recently been experiments into using semiconductor lasers as light sources in the field of distance measurement, in applications such as measuring the spacing between vehicles. When a semiconductor laser is used to measure a distance, high-power pulses of light are emitted toward a target, and the distance to the target is calculated from the time taken from the emission of the pulsed light until the reception of light reflected from the target.

The characteristics demanded of a semiconductor laser capable of performing in this manner are (a) an ability to lase at a high power level of, for example, a maximum output of at least 50 W, (b) a single-peaked far-field pattern, (c) no delay in the lasing, and (d) emission of light in a wavelength region that is not easily affected by sunlight. Of these characteristics, the output and lasing wavelength of a semiconductor laser greatly influence the capabilities of the distance measurement apparatus. In other words, the output of the semiconductor laser affects the distance travelled by the light, so that the distance the light travels increases as the light output increases, and thus the measurable range also increases. Another point concerning the lasing wavelength of the laser is that it is advantageous to have a longer wavelength. If, for example, a distance measurement apparatus is used as a vehicle-spacing measurement apparatus, sunlight would interfere as noise in this distance measurement apparatus. In order to avoid the problem of such noise, a bandpass filter that passes only light of the same wavelength of the laser beam is generally placed in front of the light-receiving sensor, in order to cut out as much of the sunlight as possible. Nevertheless, it is impossible to prevent sunlight of the same wavelength as the laser beam from being incident on the light-receiving sensor. The energy density distribution of sunlight reaches as low as the long wavelengths of the infrared region. This means that the effects of sunlight would be less likely to become a problem if the lasing wavelength of the laser could be made longer, and thus noise due to sunlight would be reduced.

However, the maximum output of a popular semiconductor laser is approximately 20 W. Achieving a greater output causes problems in that the output becomes thermally saturated and thus efficiency drops, or the output drops because of an increase in injection current density, or the edge surfaces of the laser become damaged. If a semiconductor laser is used as a light source of a distance measurement apparatus, the distance that can be measured with a laser of a maximum output of approximately 20 W is less than 100 meters, and thus highly accurate measurement is difficult when the object to be inspected is beyond that distance.

SUMMARY OF THE INVENTION

An objective of this invention is to provide a light-sensing device that can illuminate regions that are necessary for both near-distance and far-distance detection efficiently and with a sufficiently high light intensity, and thus measure the distance to the object to be inspected with a high degree of accuracy.

The light-sensing device of this invention comprises: a light source consisting of a semiconductor laser, a light-transmitting optical system having a lens surface and a diffraction grating surface arranged on the optical axis of light emitted from the light source, and a light-receiving detection system that detects any of the emitted light that is reflected from an object to be inspected, wherein the emitted light is diffracted in at least two orthogonal directions by the diffraction grating surface.

With this light-sensing device, the light (beam) emitted from the light source is converted by the diffraction grating surface into a plurality of beams in at least two directions (X and Y directions), and the shapes of these beams can be converted into any predetermined form by the lens surface. This means that beams having any predetermined pattern can be obtained from a single light source, by combining the diffraction grating surface and lens surface as required. Since the light-sensing device of this invention diffracts the beams in at least two intersecting directions, the projected light pattern can be controlled in a two-dimensional fashion, so that an illumination region with a wide angle of projection can be obtained in a near-distance region from zero-order diffracted light and positive/negative first-order diffracted light, and an illumination region can be obtained for a far-distance region that mainly comprises the zero-order diffracted light. Since the light-sensing device of this invention uses a single light source, it is simple to simplify the projection apparatus and make it smaller.

The light-sensing device of this invention is suitable for use in an application that requires differing illumination ranges for a near-distance region and a far-distance region, such as a vehicle-mounted obstacle detector or ship's radar.

If the diffraction grating surface has the function of diffracting light in at least two intersecting directions, the configuration is not specifically limited, but it is preferable that it is formed on a single substrate, from consideration of reducing optical losses. Examples of diffraction grating having preferred diffraction grating surfaces are given below.

(a) A diffraction grating in which the diffraction grating surface comprises a first diffraction grating surface formed on one surface of a grating substrate, and a second diffraction grating surface formed on the other surface of the grating substrate, each diffraction grating surface has a grating pattern formed of a linear group of ridges and troughs in a single direction, and the direction of the group of ridges and troughs of the first diffraction grating surface is orthogonal to the direction of group of ridges and troughs of the second diffraction grating surface.

(b) A diffraction grating in which the diffraction grating surface is formed on one surface of a grating substrate and this diffraction grating surface has a grating pattern formed of orthogonal linear groups of ridges and troughs.

(c) A diffraction grating in which the diffraction grating surface is formed on one surface of a grating substrate and this diffraction grating surface has a grating pattern formed of a group of ridges and troughs in a concentric curved shape, such as circles or ellipses.

(d) A diffraction grating in which the lens surface and the diffraction grating surface are formed on a single substrate, a refraction lens surface is formed on one surface of the substrate, and a diffraction lens surface comprising a group of ridges and troughs in a concentric circular or elliptical shape is formed on the other surface thereof.

(e) A diffraction grating in which a group of ridges and troughs that configure the diffraction grating surface has a sectional shape that is a saw-tooth pattern.

The semiconductor laser that is used as a light source of the present invention preferably comprises a substrate formed of a compound semiconductor of a first conductivity type, semiconductor layers deposited on one surface of the substrate, a current constriction layer formed on the semiconductor layers and having at least one stripe-shaped current injection region, and a pair of reflective layers formed on edge surfaces of the substrate and the semiconductor layers;

the semiconductor layers comprise:

a first cladding layer of the first conductivity type positioned on the substrate side, a first optical waveguide layer of the first conductivity type formed on the first cladding layer, an active layer formed on the first optical waveguide layer and having a quantum-well structure, a second optical waveguide layer of a second conductivity type formed on the active layer, a second cladding layer of the second conductivity type formed on the second optical waveguide layer, and a contact layer of the second conductivity formed on the second cladding layer, and wherein:

the active layer has flatness of such a degree that roughness with respect to a reference surface within a unit area of 1 mm×1 mm is no more than ±0.1 μm, the width of the current injection region of the current constriction layer is between 100 μm and 250 μm, and the resonator length is between 500 μm and 1,000 μm.

In this semiconductor laser, the semiconductor layers are preferably formed of AlGaAs-type compound semiconductors.

When referring to the flatness of the active layer, the reference surface is assumed to be at the active layer at a height which corresponds to the average of the total thickness of the substrate and the layer which comprises the active layer and the semiconductor layers below the active layer. Roughness means the height or depth of any convex or concave portions of the surfaces, or unevenness in the film thickness, found by measuring the surface with a contact-type film roughness meter or a Nomarski-type film roughness measurement method.

The reference surface could be specified by the following method. In other words, the epitaxial growth on the substrate is terminated after the active layer is grown. Then the exposed active layer surface is measured by, for example, a contact-type film roughness meter, to obtain the thickness distribution of the substrate and the layer comprising the active layer and the semiconductor layers below the active layer. By obtaining the average film thickness of the substrate and the layer per unit area, it is possible to specify a reference surface.

With a high-power semiconductor laser that has a wide lasing region, it is particularly easy for roughness in the active layer to cause unregulated spot-shaped lasing. That is why it is important to guarantee the flatness of the active layer.

The semiconductor laser can emit high-power light of a long wavelength of, for example, at least 850 nm and at a maximum power of, for example, at least 50 W. Further, the laser can emit laser beam having a uniform luminous intensity distribution within a wide lasing region of approximately 100 μm to 250 μm.

This semiconductor laser preferably has a configuration such that the semiconductor layers are formed of AlGaAs-type compound semiconductors, and the active layer comprises well and barrier layers, the value of x in the $Al_xGa_{1-x}As$ of a well layer is 0, the value of x in the $Al_xGa_{1-x}As$ of a barrier layer is between 0.15 and 0.25, and the value of x in the $Al_xGa_{1-x}As$ of the first and second cladding layers is at least 0.28.

Specifying the Al compositions of the active layer and the cladding layers makes it possible to control any shift in the lasing wavelength of this semiconductor laser towards a shorter wavelength and thus enable it to lase at a long wavelength of at least 850 nm, regardless of the fact that the active layer has a quantum-well structure.

In this semiconductor laser, the pair of reflective layers formed on edge surfaces of the laser preferably comprises a first reflective layer with a reflectance of 0.1% to 5% and a second reflective layer with a reflectance of at least 98.5%. Each reflective layer is preferably formed of one or more pairs of two thin dielectric films of differing refractive indices deposited alternately. Each pair of thin dielectric films is arranged in such a manner that in the first reflective layer a thin dielectric film with a larger refractive index is deposited on the semiconductor-layer side, while in the second reflective layer a thin dielectric film with a smaller refractive index is deposited on the semiconductor-layer side.

Controlling the reflectances of the reflective layers to be in the foregoing ranges makes it possible to obtain a high external differential quantum efficiency, and thus obtain a high light output, while preventing any increase in the lasing threshold current. Regulating the sequence in which the thin dielectric films form the reflective layers in the above described manner ensures that the first reflective layer has a low reflectance and the second reflective layer has a high reflectance.

In addition to the configuration described above, the semiconductor laser of the present invention also preferably comprises one blocking layer formed between at least one pair of the first cladding layer and the first optical waveguide layer, and between the second cladding layer and the second optical waveguide layer.

The semiconductor layers are formed of AlGaAs-type compound semiconductors, and the value of x in the $Al_xGa_{1-x}As$ of the first and second cladding layers of this semiconductor laser is preferably between 0.20 and 0.40.

The semiconductor layers are formed of AlGaAs-type compound semiconductors, and the blocking layers each have a preferable film thickness of between 8 nm and 20 nm, and the value of x in the $Al_xGa_{1-x}As$ thereof is preferably between 0.30 and 0.60.

With this variation of the semiconductor laser, a thin blocking layer is interposed between a cladding layer and an optical waveguide layer, so that the light-emitting efficiency and temperature characteristic can be improved without increasing the Al composition of the cladding layers. Reducing the Al composition of the cladding layers decreases the optical confinement factor, so that the semiconductor laser can produce a beam with a narrow radiation angle and the edge surfaces become less susceptible to damage.

BRIEF DESCRIPTION OF THE DRAWINGS

FIG. 16A shows location of an optical element and beam shape in the X-Z plane and FIG. 16B shows location of an optical element and beam pattern in the Y-Z plane;

FIG. 9A is a plan view and FIG. 9B is a sectional view thereof taken along the line A—A' in FIG. 9A;

DESCRIPTION OF THE PREFERRED EMBODIMENTS

Figure 1:
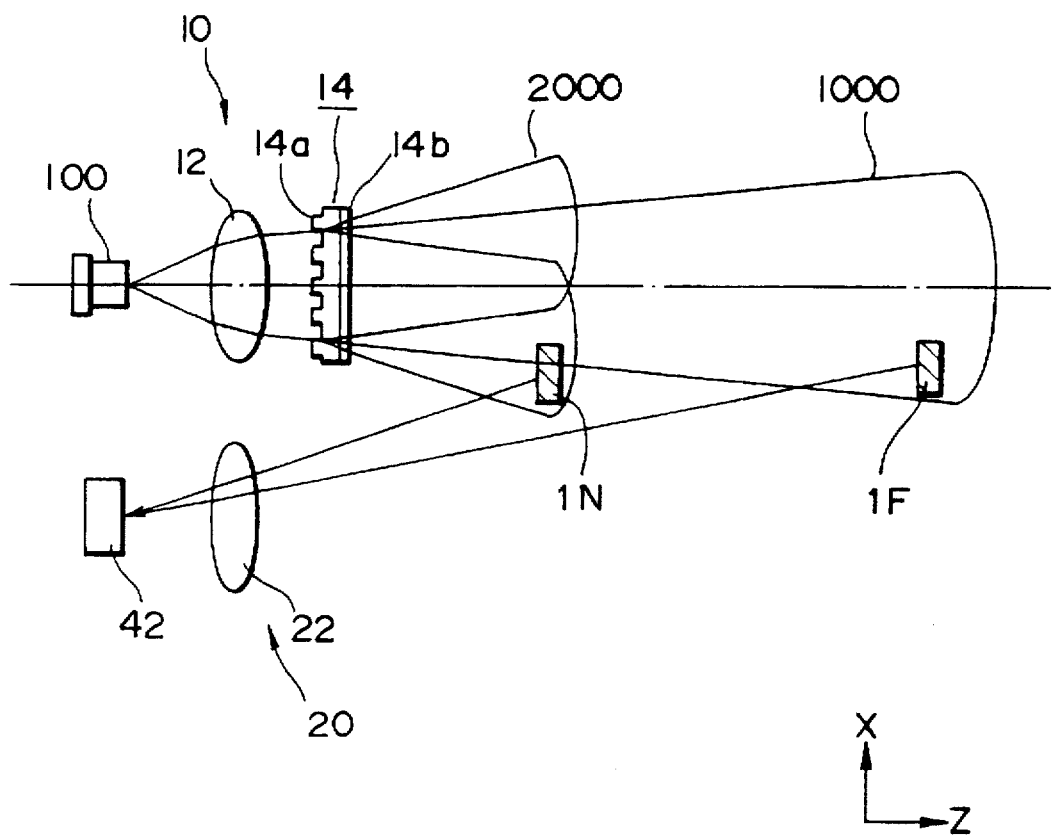
FIG. 1 is a schematic view of an example of a light-sensing device in accordance with this invention.

A schematic view of an example of a light-sensing device to which the present invention is applied is shown in FIG. 1. This light-sensing device is configured to comprise a semiconductor laser 100 acting as a light source, a light-transmitting optical system 10, a light-receiving optical system 20, and a light detector 42. This light-transmitting optical system 10 is configured of a lens 12 and a diffraction grating 14, and the light-receiving optical system 20 is configured of a lens 22.

With this device, light emitted from the semiconductor laser 100 passes through the lens 12 and the diffraction grating 14 to form a far-distance illumination region that mainly comprises zero-order diffracted light 1000 and a near-distance illumination region that mainly comprises the zero-order diffracted light 1000 and positive/negative first-order diffracted light 2000, respectively. If there is an object to be inspected 1F or object to be inspected 1N within these regions, light reflected back from these objects reaches the light detector 42 through the light-receiving optical system 20.

Figure 2:
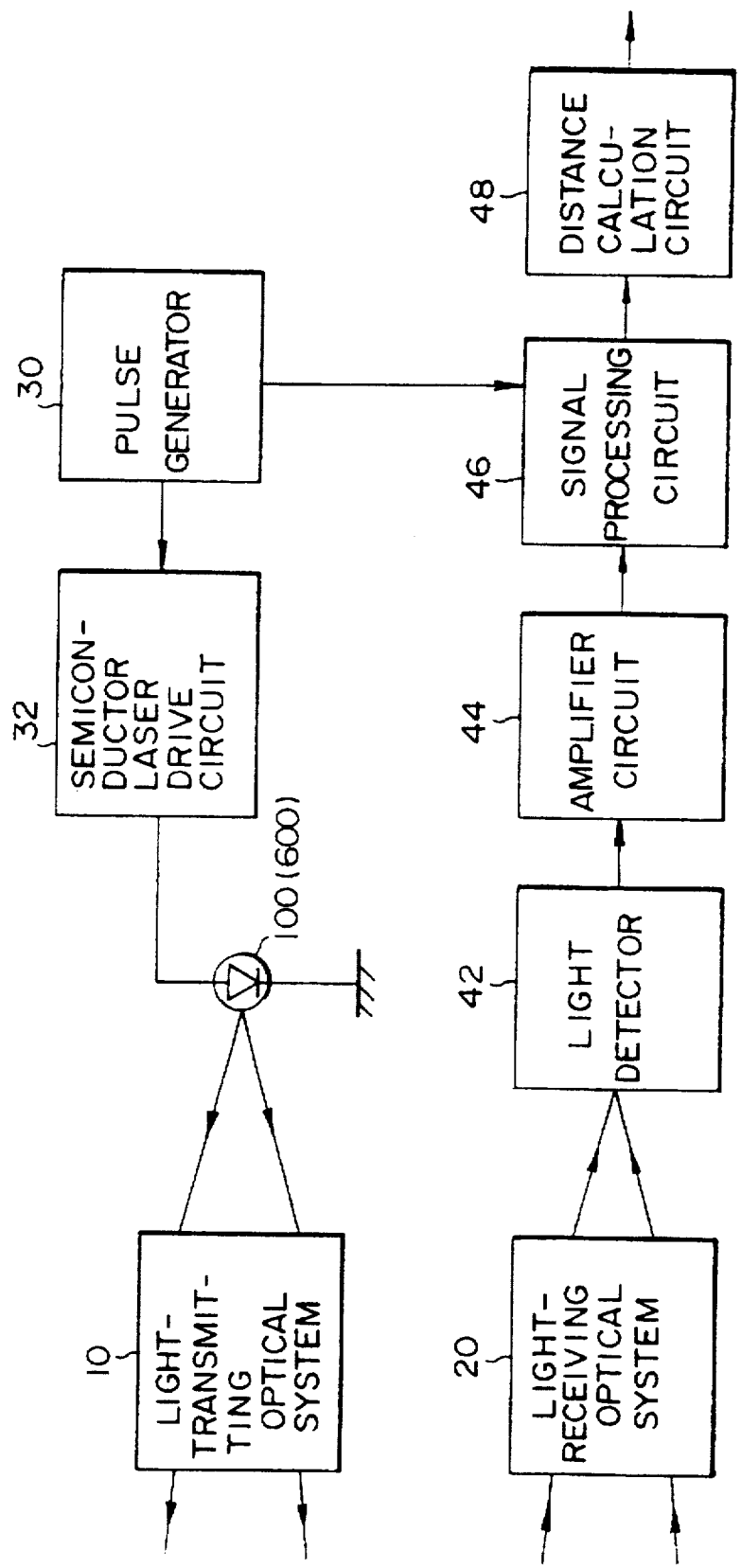
FIG. 2 is a block diagram of the light-sensing device of FIG. 1.

A block diagram of an example of the light-sensing device of FIG. 1 is shown in FIG. 2.

This light-sensing device comprises a pulse generator 30 that repeatedly outputs laser-driving pulses. The pulses output from the pulse generator 30 are input to a semiconductor laser drive circuit 32 and a signal processing circuit 46.

The semiconductor laser drive circuit 32 drives the semiconductor laser 100 every time a driving pulse is input, and thus measurement light is output from the semiconductor laser 100. The light that is output from the semiconductor laser 100 is output as a laser beam for measuring, directed forward into space, through a light-transmitting optical system 10.

This measurement laser beam hits an object to be inspected, light scattered or reflected therefrom is detected by a light detector 42 via a light-receiving optical system 20, and this light is converted into an electrical signal and is input to the signal processing circuit 46 via an amplifier circuit 44. The signal processing circuit 46 measures the time taken for the laser beam to travel from the light-transmitting side to the light-receiving side, then outputs these measurement results toward a distance calculation circuit 48. Note that ordinary components used in range-finding radar systems can be used as components such as the light-receiving optical system 20 and the light detector 42.

Figure 3:
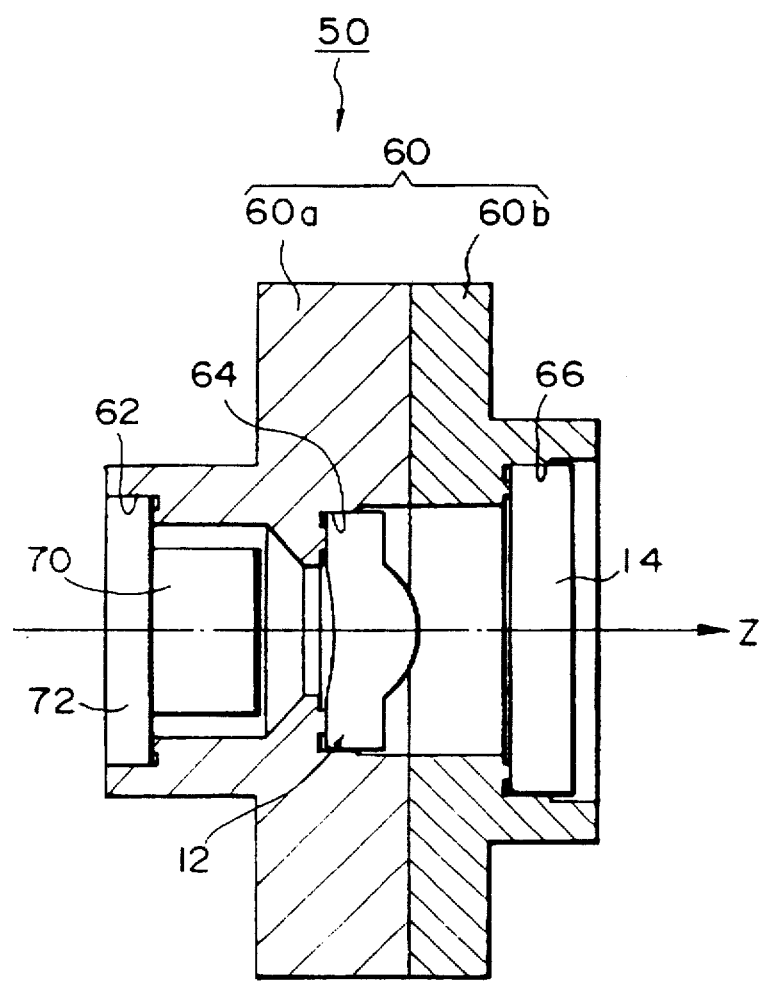
FIG. 3 is a partial sectional view through the configuration of the light-transmitting section of the light-sensing device of FIG. 1.

FIG. 3 is a partial sectional view illustrating a light-transmitting section 50 in which a lens 12 and a diffraction grating 14 are mounted as the light-transmitting optical system 10.

A holder 60 of the light-transmitting section 50 has a configuration such that a cylindrical portion thereof is split into a first holder portion 60a and a second holder portion 60b that are connected together in the axial direction. The first holder portion 60a has a cylindrical portion that protrudes outward in the axial direction, and a step-shaped first support portion 62 is formed in a cylindrical end portion thereof, for holding an installation portion 72 of a laser package 70. A step-shaped second support portion 64 is formed in substantially the center of the first holder portion 60a for holding the lens 12. A cylindrical portion is formed protruding outward in the axial direction from the second holder portion 60b, and a step-shaped third support portion 66 is formed within the cylindrical portion for holding the diffraction grating 14.

The laser package 70, lens 12, and diffraction grating 14 are fixed to the corresponding first support portion 62, second support portion 64, and third support portion 66 by, for example, a light-hardening adhesive. Screwing or caulking in which local pressure is applied to parts of the holder to deform them plastically could also be used as the support means.

Since the holder 60 of this embodiment is divided into the first holder portion 60a and second holder portion 60b, the second holder portion 60b can be fixed to the first holder portion 60a by means such as screws after the lens 12 has been positioned in the second support portion 64, and thus the lens 12 can be positioned accurately and simply.

The shape of the elliptical laser beam is formed by the lens 12 into a shape for the detection region which is necessary for the far-distance region, such as a roughly rectangular shape.

The surfaces that configure this lens 12 could be circular cylindrical surfaces, toroidal surfaces, or aspheric lens surfaces. The laser beam could also be shaped by a combination of a plurality of lenses, such as a combination of a plano-concave lens and an aspheric lens. A plastic lens that is injection-molded of a material such as acrylic resin, polycarbonate, or a noncrystalline polyolefin, or a pressed glass lens, could be used as the lens 12.

The two surfaces of the lens 12 are preferably provided with an antireflection coating formed of magnesium fluoride or a dielectric multi-layer film. In this embodiment, the reflectance at the lasing wavelength of this anti-reflection coating is set to be approximately 0.5%.

Figure 4:
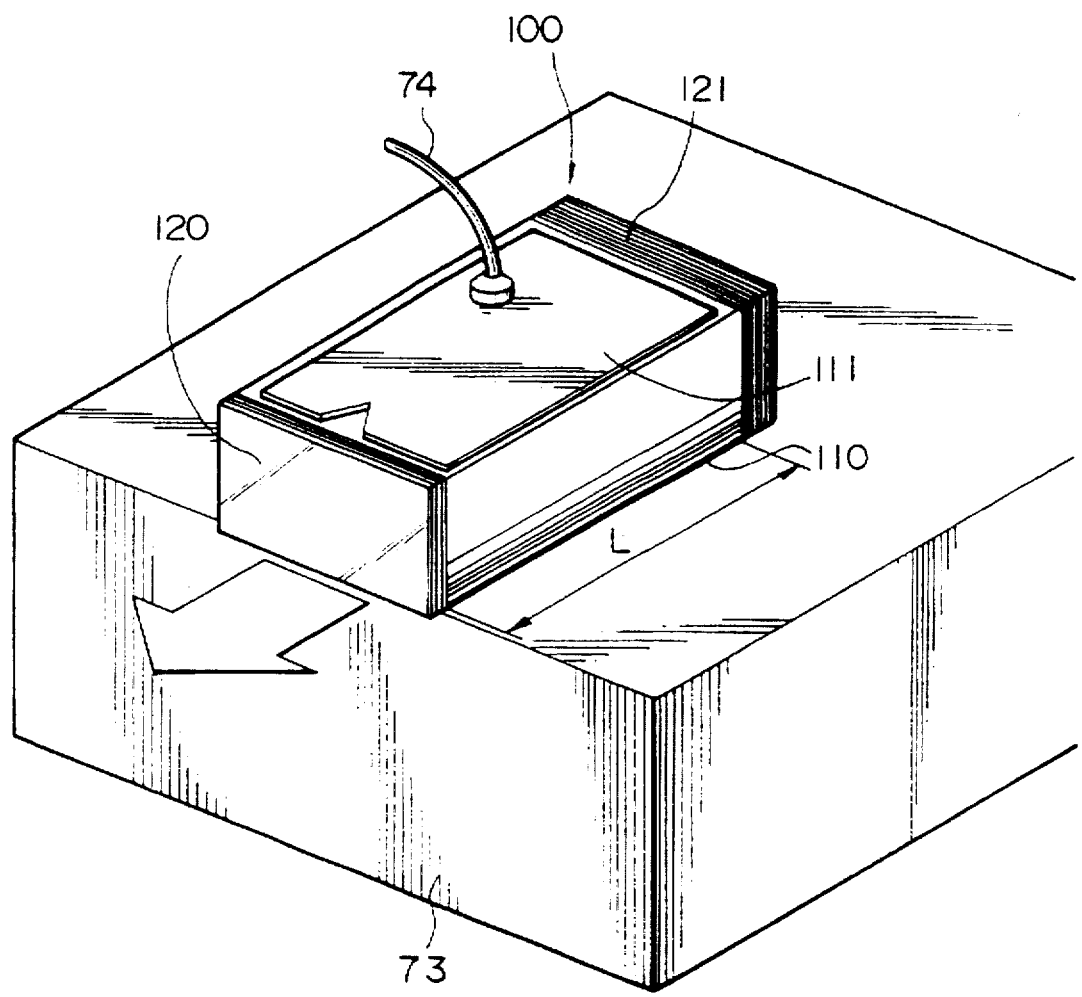
FIG. 4 is a perspective view of a semiconductor laser mounted on a support body.

A schematic perspective view of the semiconductor laser 100 within the laser package 70 is shown in FIG. 4. In this example, a support body 73 of a material such as aluminum nitride (AlN) or silicon is provided between the semiconductor laser 100 (laser chip) and a heatsink (not shown) made of a metal such as copper. A support body of aluminum nitride is particularly preferable. Since aluminum nitride has a high level of thermal conductivity and a coefficient of thermal expansion that is similar to that of the AlGaAs-type compounds of the semiconductor laser 100, it acts to ensure there are no residual stresses in the active layer of the laser after the laser chip is fused at a temperature of 250° C. to 350° C. using an alloy of gold and tin (Au/Sn) or the like. The high level of thermal conductivity of the aluminum nitride also has the effect of allowing the heat generated by the active layer to escape, thus increasing the life of the laser.

The thickness of this support body 73 is preferably between approximately 150 μm and 190 μm. This is because calculation of the residual stresses generated in the active layer of the laser by the coefficients of thermal expansion of the laser chip, the metal such as copper (for the heatsink), and the AlN (for the support body) has found that tensile and compressive stresses could be generated relative to the thickness of the support body, but at such a thickness the residual stresses are extremely small.

Figure 5A:
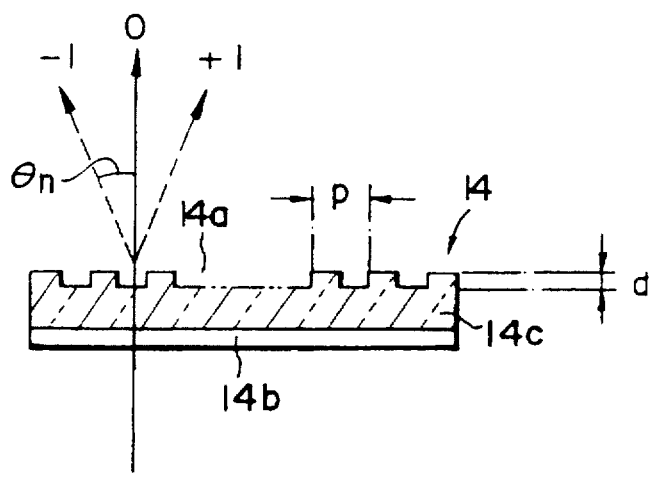
FIGS. 5A and 5B are a sectional view and plan view of the diffraction grating shown in FIG. 1.
Figure 5B:
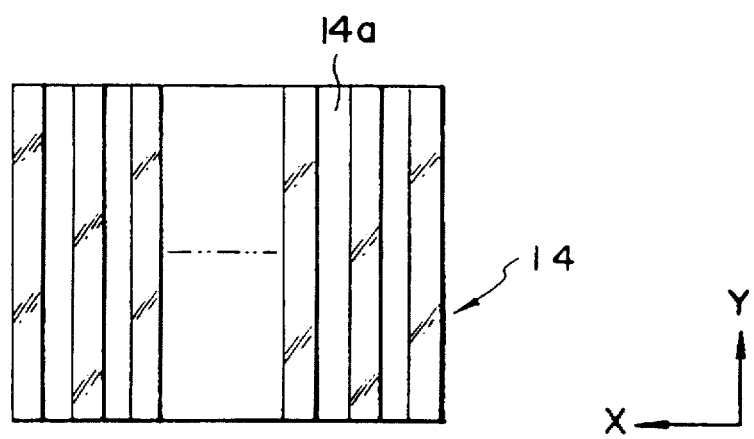

An example of the diffraction grating 14 is shown in FIGS. 5A and 5B, where FIG. 5A is a sectional view and FIG. 5B is a plan view.

The diffraction grating 14 shown in FIGS. 5A and 5B is a phase grating on a substrate of a transparent material such as glass or a synthetic resin. Diffraction grating surfaces 14a and 14b are formed on a grating substrate 14c of this diffraction grating 14. A plurality of parallel grating grooves are formed in one direction (the Y-axis direction) on the first diffraction grating surface 14a to form a grating pattern of linear groups of ridges and troughs. The grating grooves on the second diffraction grating surface 14b are formed to be in a direction (X-axis direction) perpendicular to those on the first diffraction grating surface, to form a similar grating pattern of linear groups of ridges and troughs. An antireflection coating is formed on each surface of the diffraction grating 14.

In general, light passing through a diffraction grating surface of a simple grating type having the above described linear grating grooves is divided into zero-order diffracted light that passes straight through without being diffracted and nth-order diffracted light (where n is an integer) that passes through at a diffraction angle of θn. With the diffraction grating of the present invention, the zero-order diffracted light is used as a main beam and the positive/negative first-order diffracted light is used as sub-beams. The higher-order light is of a low intensity, so it does not contribute significantly to the measurement.

Strictly speaking, the light entering the diffraction grating is not limited to being incident perpendicular thereto, but if the light is considered to be incident substantially perpendicular to the grating, to simplify the explanation, the relationship between the diffraction angle θ of the positive/negative first-order diffracted light, the wavelength λ of the light source, and the pitch p of the diffraction grating is given by:

$$\sin \theta = \lambda/p$$

The intensities of zero-order diffracted light and positive/negative first-order diffracted light depends on the depth d of the grating grooves. If the ratio of ridges and grooves of the diffraction grating is 1:1 (a "duty ratio" of 1 in 2), the intensity ratios to the incident light $\eta_0$ and $\eta_1$ of the zero-order diffracted light and positive/negative first-order diffracted light are given by:

$$\eta_0 = \cos^2(\pi d \Delta n/\lambda)$$

$$\eta_1 = (2/\pi)^2 \sin^2(\pi d \Delta n/\lambda)$$

Note that $\Delta n = n-1$, where n is the refractive index of the diffraction grating material. It is clear from these equations that, if the wavelength λ of the light source and the refractive index n of the diffraction grating material are constant, the intensity ratio between the zero-order diffracted light and positive/negative first-order diffracted light can be freely selected by adjusting the depth d of the grooves in the diffraction grating. The projection angle of the beam can also be set selectively by changing the grating pitch p or by changing the positional relationships of the light source, diffraction grating, and projection lens.

Beam Pattern

The description now turns to the beam pattern of the light emitted from the semiconductor laser 100. If the horizontal direction is taken to be the X-axis, the vertical direction the Y-axis, and the direction along the beam the Z-axis (optical axis), the beam pattern shown in FIG. 6A is in the X-Z plane and that shown in FIG. 6B is in the Y-Z plane.

In the light-sensing device of this embodiment, the laser package 70 (see FIG. 4) is fixed in such a manner that the connecting surface between the semiconductor laser 100 and the support body 73 is aligned in the Y-Z plane direction. The diffraction grating 14 is positioned in such a manner that the grating grooves of the diffraction grating surfaces 14a and 14b thereof are aligned in the Y-axis direction and X-axis direction, respectively.

In the light-sensing device of the above-described configuration, the light emitted from the aperture of the semiconductor laser 100 is converted by the lens 12 into a beam that is nearly parallel, then it passes through the diffraction grating 14 and is split thereby into three beams in both the X and Y directions.

Figure 6A:
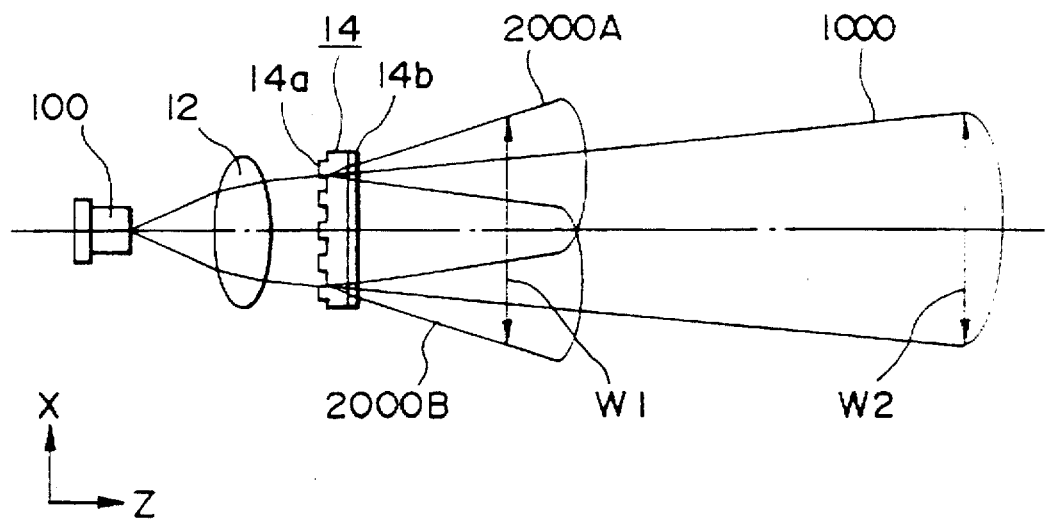
FIGS. 6A and 6B show a light-transmitting optical system of the present invention, where
Figure 6B:
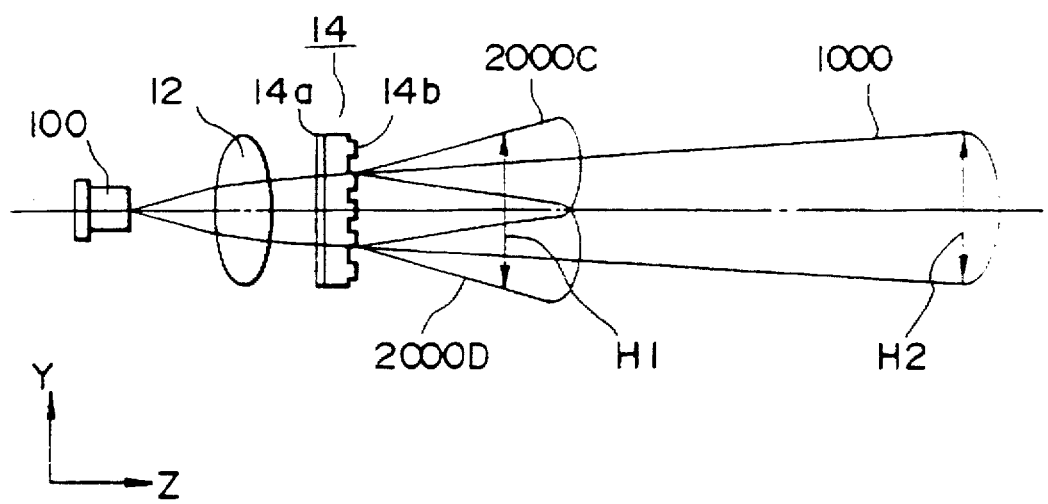

In other words, FIG. 6A shows how the light emitted from the semiconductor laser 100 is split by the first diffraction grating surface 14a of the diffraction grating 14 into three beams in the X-Z plane: zero-order diffracted light 1000 that is roughly parallel to the optical axis Z, positive first-order diffracted light 2000A, and negative first-order diffracted light 2000B. Similarly, FIG. 6B shows how it is split by the second diffraction grating surface 14b into three beams in the Y-Z plane: the zero-order diffracted light 1000 that is roughly parallel to the optical axis Z, positive first-order diffracted light 2000C, and negative first-order diffracted light 2000D. Since the light that strikes the diffraction grating 14 of this optical system is substantially perpendicular to the diffraction grating surfaces, the projection angles of the laser beams can be controlled by adjusting the diffraction angles of the diffraction gratings. This means that it is necessary only to consider the diffraction angle of the positive/negative first-order diffracted light as set by the diffraction gratings in this optical system, which has the advantage of simplifying control of the optical system.

The projection angles of the light and diffraction efficiency in the optical system of the above configuration will now be described. The projection angle of the light depends on the pitch p of each diffraction grating and the diffraction efficiency of the light depends on the depth d of the grooves in the diffraction grating, and these values can be set to suitable ranges to suit considerations such as the application of the light-sensing device. In other words, if this device is used in range-finding radar, the intensity and diffusion region of the emitted light could be set after consideration of the distance to the target. If, for example, the light-sensing device of this embodiment is used in a vehicle-mounted obstacle detector that detects obstacles in a predetermined direction relative to a moving vehicle, a wide projection angle is necessary in the region close to the vehicle to increase the measurable range therein, and it is preferable that projection extends as far as possible in the direction of motion, such as up to 150 meters ahead.

More specifically, taking as an example the detection region within a near-distance region up to 40 meters ahead of a vehicle in motion, a detection region of a width of at least W1 (for example, approximately 4 m) is required in the X-axis direction (horizontal direction) and a detection region of a width of at least H1 (for example, approximately 1.5 m) is required in the Y-axis direction (vertical direction), as shown in FIGS. 6A and 6B. Similarly, taking the example of the detection region within a far-distance region up to 150 meters ahead of the vehicle, a detection region of a width of at least W2 (for example, approximately 4 m) is required in the X-axis direction and a detection region of a width of at least H2 (for example, approximately 1.5 m) is required in the Y-axis direction.

In order to obtain a detection region that is as wide as possible in the near-distance region, it is preferable that the zero-order diffracted light 1000 and the positive/negative first-order diffracted light 2000A and 2000B are in a partially overlapping state but are spread as far as possible in the X-axis direction. Similarly, it is preferable that the zero-order diffracted light 1000 and the positive/negative first-order diffracted light 2000C and 2000D are in a partially overlapping state but are spread as far as possible in the Y-axis direction. Since only the zero-order diffracted light is used in the case of the far-distance region, it is preferable that the illumination region of this zero-order diffracted light substantially matches the required detection region, to make effective use of this light.

From consideration of these conditions, it was clear when it came to determining the grating pitch p that it is preferable to have a range of 15 µm to 40 µm in the X-axis direction and one of 50 µm to 90 µm in the Y-axis direction. If the pitch p of the diffraction grating is too small, the first-order diffracted light is diffracted in a direction that deviates from the Z axis.

From consideration of the condition that this device is to be used in the above described vehicle-mounted obstacle detector, it is preferable that the intensity ratio of the first-order diffraction light to the incident light is between 0.4% and 4%.

With the light-sensing device of this embodiment, the use of the diffraction grating 14 enables the laser beam to be split into three beams in the X and Y directions, so that the laser beam can be converted into measurement light beams of predetermined shapes and of sufficient light density. Therefore, if the light-sensing device is applied to the vehicle mounted obstacle detection, a single light source can provide a sufficient illumination region.

Variations of the diffraction gratings that can be used by this invention will now be discussed.

Figure 7:
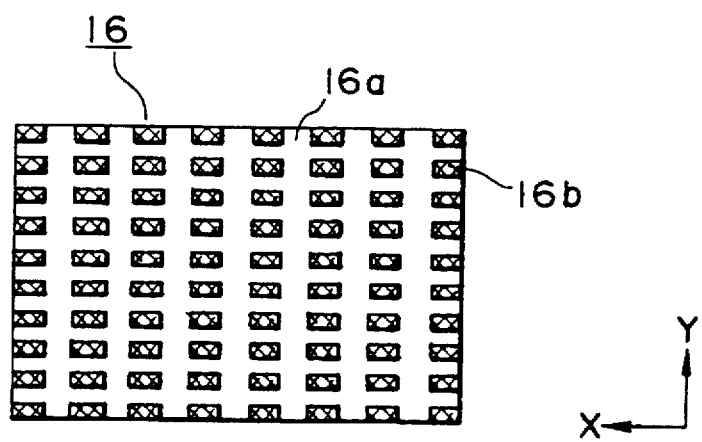
FIG. 7 is a plan view of another example of a diffraction grating that can be applied to this invention.

(a) In a diffraction grating 16 shown in FIG. 7, a diffraction grating surface is formed on one surface of a substrate in such a manner that this diffraction grating surface has a grating pattern that is formed of a plurality of linear protruding portions 16a that intersect. The portions 16b shown hatched in the figure are configured of recessed portions of a substantially rectangular cross sectional shape. The protruding portions 16a in the vertical direction are arranged to correspond to the Y direction in FIG. 6, and those in the horizontal direction are arranged to correspond to the X direction.

Figure 8:
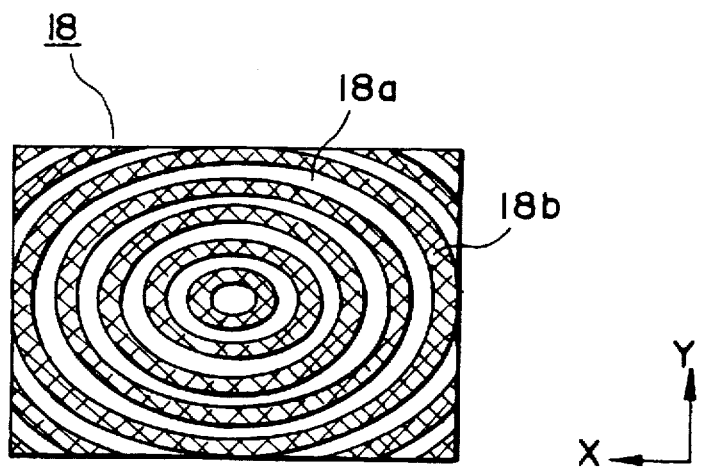
FIG. 8 is a plan view of yet another example of a diffraction grating that can be applied to this invention.

(b) In a diffraction grating 18 shown in FIG. 8, a diffraction grating surface is formed on one surface of a substrate in such a manner that this diffraction grating surface is configured of concentric ellipses. In other words, elliptical protruding portions 18a are formed concentrically and evenly spaced on the surface, with recessed portions 18b (shown hatched in the figure) between neighboring protruding portions 18a. This type of diffraction grating is usually called a grating lens, and it has a lens function. Projection angle of light in the horizontal, vertical and oblique directions can be controlled by this type of diffraction grating, enabling beam shaping.

This diffraction grating 18 is configured with an elliptical pattern to give differing angles of diffraction in the X and Y directions, but it has a concentric circular pattern if the same angle of diffraction is required in the X and Y directions. The shapes of this grating pattern are not limited to ellipses and circles; any group of curved lines that has a beam-shaping capability can be used to form this grating pattern.

Figure 9A:
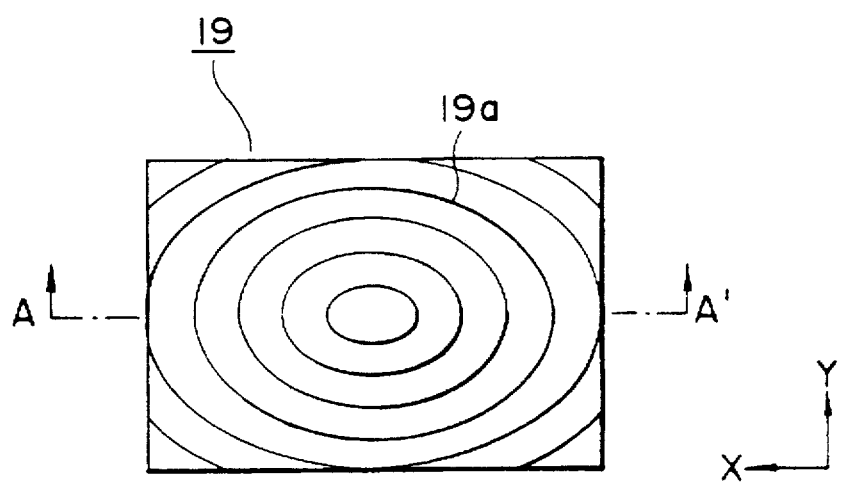
FIGS. 9A and 9B show a further example of a diffraction grating that can be applied to this invention, where
Figure 9B:
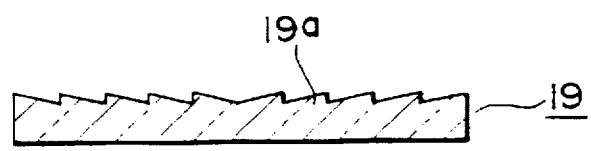

(c) In a diffraction grating 19 shown in FIGS. 9A and 9B, a diffraction grating surface is formed on one surface of a substrate in a manner similar to that of the diffraction grating 18 in that a flat surface thereof is formed to have a concentric elliptical pattern. The previously described diffraction gratings 14, 16, and 18 were all configured to have grating grooves of a rectangular sectional shape. A diffraction grating having such grating grooves utilizes both positive and negative first-order diffracted light. However, if the diffraction grating surface could be arranged to generate both a diverging positive first-order diffracted light and a converging negative first-order diffracted light from such an elliptical pattern, the diverging positive first-order diffracted light alone is preferably used for a wider illumination range in the near distance to reduce optical losses. To make the positive first-order diffraction efficiency greater than the negative first-order diffraction efficiency, it is preferable that the sectional shape of protruding portions 19a is triangular, in other words, the sectional shape of the diffraction grating surface has a saw-tooth shape, as shown in FIG. 9B. An example of such a diffraction grating is a micro fresnel lens.

Figure 10:
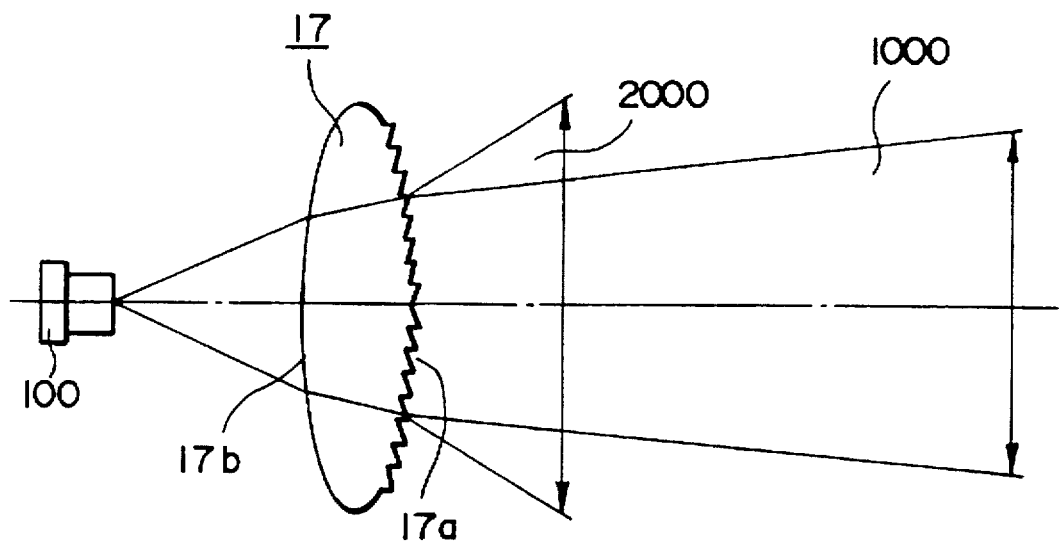
FIG. 10 shows another example of a diffraction grating that can be applied to this invention.
Figure 11:
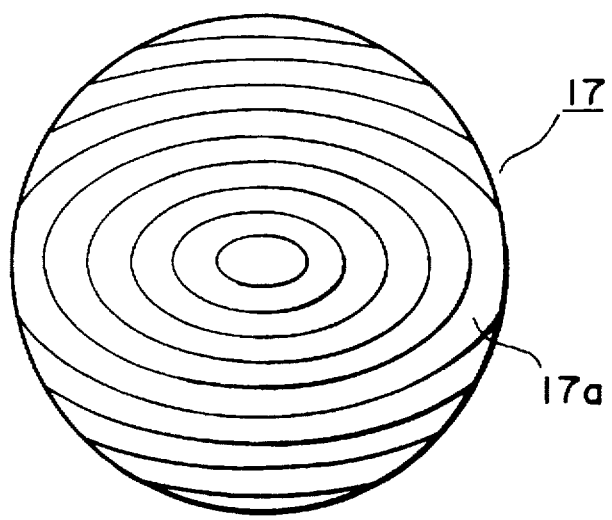
FIG. 11 is a view illustrating the diffraction grating surface of the diffraction grating of FIG. 10.

(d) In a diffraction grating 17 shown in FIGS. 10 and 11, a diffraction grating surface 17a is formed on one surface and a lens surface 17b is formed on the other surface. Note that components in FIG. 10 that substantially the same as those in FIG. 1 are denoted by the same reference numbers and further description thereof is omitted. The diffraction grating surface 17a is similar to that of the diffraction grating 19 in that it is a flat surface having a concentric elliptical pattern and the sectional shape of the diffraction grating surface is formed in a saw-tooth pattern. Forming the diffraction grating surface on a surface of a lens in this manner to provide a hybrid lens that has a lens surface and a diffraction grating surface formed on a single substrate enables reductions in optical losses and the number of components required.

As described, if the diffraction grating has the functions required of this invention, the shape of the diffraction grating is not specifically limited. Furthermore, this invention is not limited to a single diffraction grating; it can be equally well be applied to any plurality of diffraction gratings in combination. For example, two simple gratings each having linear grating grooves could be arranged in such as manner that the directions of the grooves cross one another.

A typical process of forming the diffraction grating is a method in which a mask is first attached firmly to a glass substrate coated with a photoresist, UV light is shone thereon by a photolithography technique that is used in the fine processing of ICs and the like, then unwanted resist is etched away. A diffraction grating with a saw-tooth pattern is obtained by a method such as photolithography using a mask with light and dark markings, or by multiple exposures by an electron beam, or by machining.

Semiconductor Laser

The description now turns to an example of the configuration of the semiconductor laser that is suitable for use as the light source of the light-sensing device of this invention.

Figure 12:
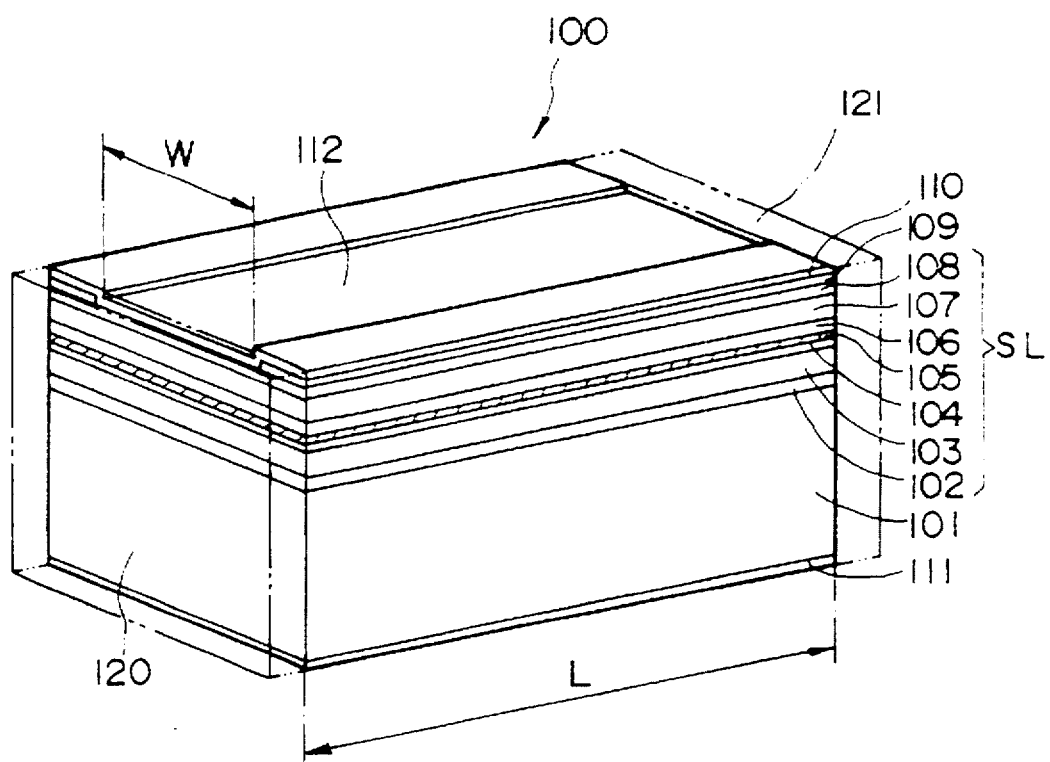
FIG. 12 is a schematic perspective view of an example of a semiconductor laser used in the present invention.

FIG. 12 is a simplified perspective view of an example of a semiconductor laser with electrode stripes to which the present invention is applied.

A semiconductor laser 100 shown in FIG. 12 has a semiconductor layer stack SL formed of a plurality of AlGaAs-type compound semiconductor layers deposited on an n-type GaAs substrate 101. This semiconductor layer stack SL comprises an n-type buffer layer 102, an n-type first cladding layer 103, an n-type first optical waveguide layer 104, an active layer 105, a p-type second optical waveguide layer 106, a p-type second cladding layer 107, and p-type contact layer 108. Details of the Al composition, film thickness, and dopant of each of these semiconductor layers are given in Table 1. Note that values in parentheses in the columns of Table 1 indicate the configuration of samples of semiconductor lasers that were used in experiments that will be described later.

TABLE 1

|  | Al Composition | Film Thickness (μm) | Dopant |
| --- | --- | --- | --- |
| Buffer layer 102 | 0 | 0.5–1.5 (0.5) | Se |
| First cladding layer 103 | 0.28–0.60 (0.31) | 0.5–1.5 (1.0) | Se |
| First optical waveguide layer 104 | 0.15–0.30 (0.20) | 0.1–0.2 (0.15) | none |
| Active layer 105 | — | 0.043–0.098 (0.075) | — |
| Well layer 105a | 0 | 0.007–0.012 (0.010) | none |
| Barrier layer 105b | 0.15–0.25 (0.20) | 0.003–0.010 (0.007) | none |
| Second optical waveguide layer 106 | 0.15–0.30 (0.20) | 0.2–0.6 (0.55) | Zn |
| Second cladding layer 107 | 0.28–0.60 (0.31) | 0.5–1.5 (1.0) | Zn |
| Contact layer 108 | 0 | 0.2–0.8 (0.6) | Zn |

On the contact layer 108 is formed a current constriction layer 109 having a stripe-shaped opening portion, that is, an opening portion for configuring a current injection region 112. A p-side electrode 110 is formed on the surface of the current constriction layer and the semiconductor layer exposed at the opening portion of the current constriction layer 109 and an n-side electrode 111 is formed on the under surface of the substrate 101. A first reflective layer 120 formed of an anti-reflective film (AR film) is provided on an edge surface along a main-beam side of the resultant assembly, and a second reflective layer 121 formed of a highly reflective film (HR film) is formed along a monitor-beam side thereof.

Figure 13:
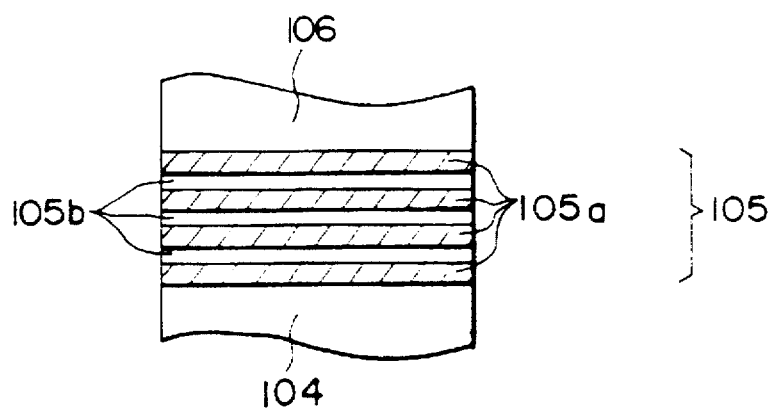
FIG. 13 is a partially enlarged view of an active layer of the semiconductor laser of FIG. 12.

The active layer 105 has a multi-quantum-well structure with a plurality of well layers, as shown in FIG. 13. This multi-quantum-well structure could have, for example, four well layers 105a and three barrier layers 105b, deposited alternately.

When AlGaAs compound semiconductors are used as the semiconductor layers, the lasing wavelength of the resultant semiconductor laser would be ordinarily in the vicinity of 870 nm. However, since a quantum-well structure is employed as the active layer, which causes a shift in the lasing wavelength toward a shorter wavelength, the resultant AlGaAs semiconductor laser having a quantum-well structure has a lasing wavelength that is usually shorter than 830 nm.

The present invention provides a quantum-well semiconductor laser that is effective for lasing at a longer wavelength of at least 850 nm by regulating the semiconductor layers, particularly the flatness of the active layer and the composition of the cladding layers.

Figure 14:
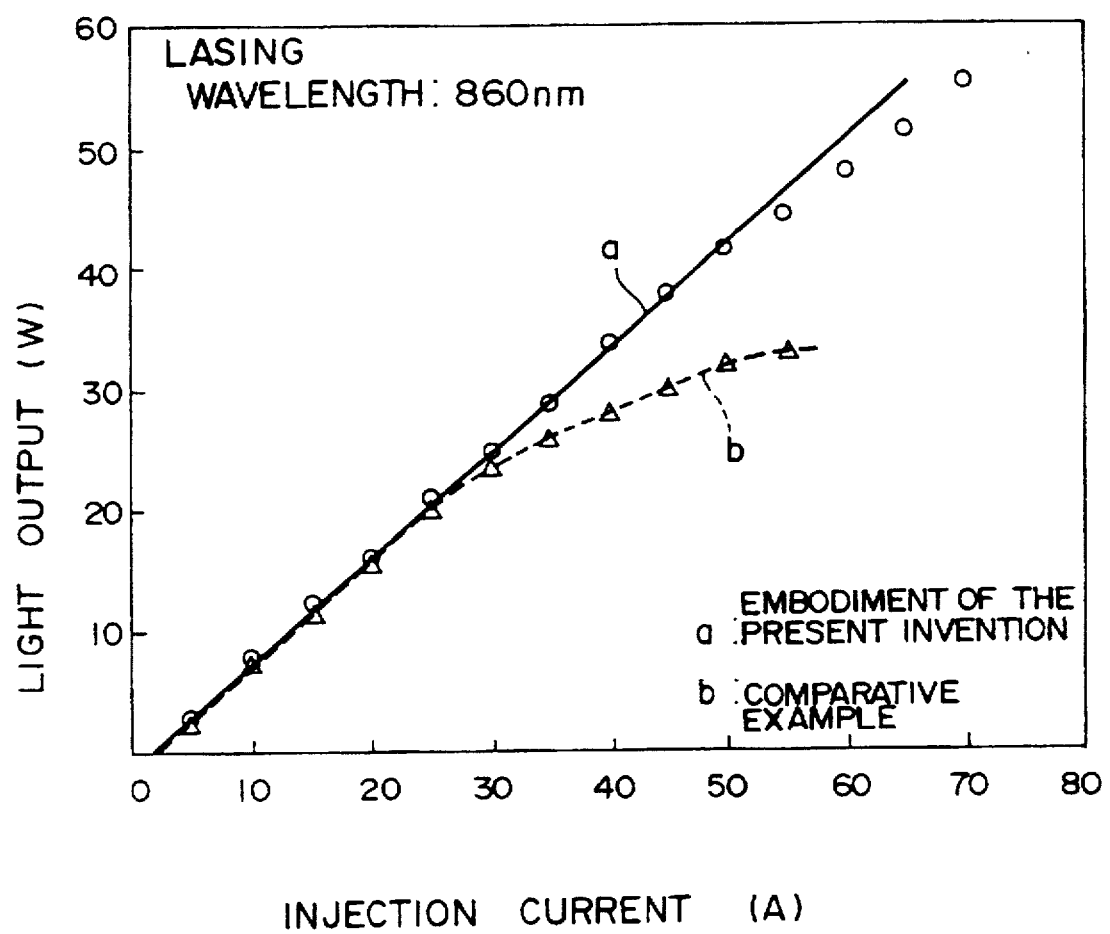
FIG. 14 is a graph comparing the injection current-light output (I-L) characteristics of the semiconductor laser of FIG. 12 and a comparative semiconductor laser.

The relationship between the composition of the cladding layers and the characteristics of the resultant semiconductor laser will first be described. FIG. 14 illustrates the injection current-light output characteristic (I-L characteristic) of a sample of the semiconductor laser of this embodiment and that of a sample with cladding layers of a different Al composition created for comparison. The structure of this comparative sample is equivalent to that of the sample of this embodiment, except that the Al composition (the value of x in $Al_xGa_{1-x}As$) of both the first cladding layer and the second cladding layer is 0.22.

From comparison of the experimental results shown in FIG. 14, it is apparent that there is no great difference between the two I-L characteristics when the injection current is low. However, when the injection current exceeds 20 A, it is clear that the light output of the laser of the comparative sample drops dramatically.

Figure 15:
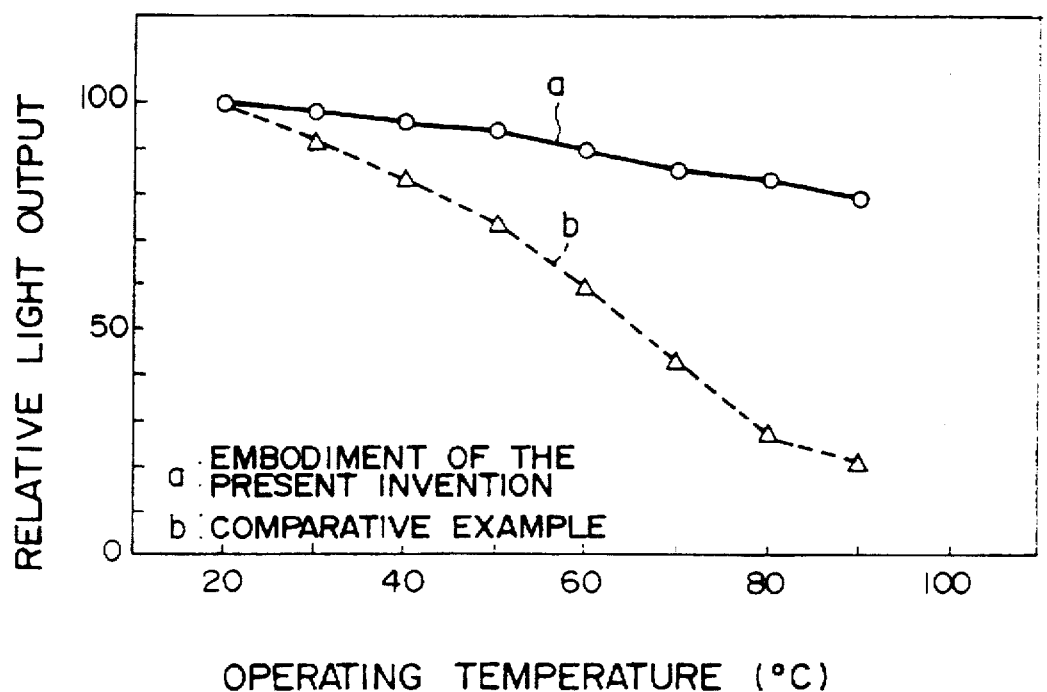
FIG. 15 is a graph showing the dependency on temperature of the light outputs achieved by the semiconductor laser of FIG. 12 and the comparative semiconductor laser.

The difference between the two semiconductor lasers becomes obvious when their temperature characteristics are compared. FIG. 15 is a graph of these temperature characteristics. This graph plots light output over a temperature range of 20° C. to 90° C. while the same current is injected, and shows that the light output is dependent on temperature. The injection current in this experiment is 30 A.

According to FIG. 15, if the light output at 90° C. is assumed to be ΔT, when the light output at 20° C. is taken to be 100, the sample of this embodiment has a ΔT of 80 while that of the comparative example has a ΔT of 20. It is thus clear that the light output of the semiconductor laser of this embodiment is far less dependent on the operating temperature than the laser of the comparative example.

Since the Al composition of the cladding layers of the laser of the comparative example is as low as 0.22, it is assumed that the injected carriers overflow from the active region when the injection current is high, or when the temperature of junction portions is high, and thus the efficiency drops. Calculations show that the difference between the energy gap of the active layer and that of each cladding layer in the laser of the comparative example is only about 0.23 eV. Research conducted by the inventors has proved that, if this energy gap difference between the active layer and each cladding layer is greater than 0.35 eV, favorable light-emitting efficiency and temperature characteristics can be obtained. Thus it is preferable that the Al composition of the cladding layers of the quantum-well semiconductor laser of this embodiment is greater than 0.28.

Further, the active layer 105 must have a flatness such that the roughness thereof is no more than ±0.1 μm, preferably no more than ±0.07 μm, with respect to a reference surface within a unit area of 1 mm×1 mm. In the sample of this embodiment, the roughness (degree of flatness) of the surfaces of the active layer, as obtained by a contact-type film roughness meter (Dektak 3030, manufactured by Sloan Technology), was within ±0.05 μm.

Note that the reference surface of the active layer was determined by the method described above.

The width of the current injection region of the current constriction layer 109 (shown as W in FIG. 12) is between 100 μm and 250 μm, preferably between 150 μm and 200 μm. If the width of the current injection region is less than 100 μm, the injection current density increases and thus it is difficult to achieve an increased light output. If this width exceeds 250 μm, on the other hand, the light intensity distribution at the laser-emitting edge surface becomes uneven, and the radiated beam does not have a single peak pattern.

Figure 16:
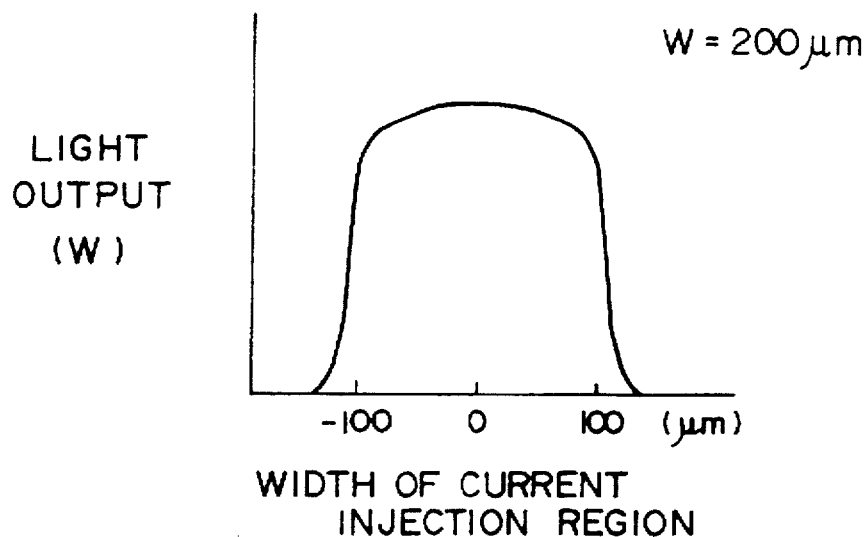
FIG. 16 is a graph showing the relationship between width of a current injection region and light output obtained for the semiconductor laser of FIG. 12.
Figure 17:
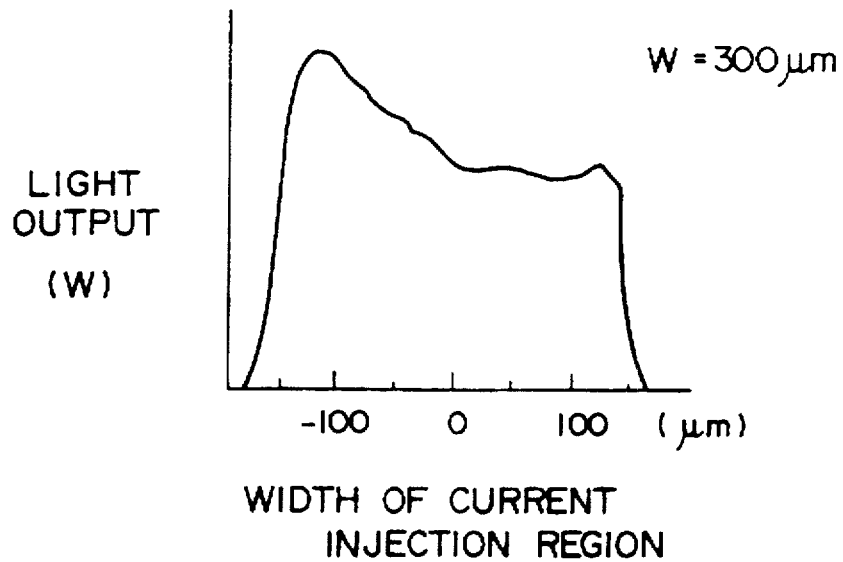
FIG. 17 is a graph showing the relationship between width of a current injection region and light output obtained for the comparative semiconductor laser.

Experimental results supporting this finding are shown in FIGS. 16 and 17. In each of FIGS. 16 and 17, the width W of the current injection region is plotted along the axis of abscissas and light output along the axis of ordinates. FIG. 16 shows the light intensity distribution when the width W is 200 μm and FIG. 17 shows the light intensity distribution when the width W is 300 μm, which exceeds the range of the present invention. From FIG. 16 it is clear that a substantially uniform light output is obtained over the entire width when the width of the injection current region is 200 μm, and thus lasing in a horizontal mode is obtained with a favorable single peak pattern. In contrast, FIG. 17 shows that a uniform light intensity distribution cannot be obtained when the width of the current injection region is 300 μm.

The semiconductor laser 100 of this embodiment has a resonator length (shown as L in FIG. 12) that is between 500 μm and 1,000 μm, preferably between 600 μm and 900 μm. If the resonator length L is less than 500 μm, the injection current density increases and the light output drops. On the other hand, if the resonator length L exceeds 1,000 μm, the current at the start of lasing increases and the driving current required for achieving the predetermined light output also increases, and thus it is difficult to create the drive circuit.

Figure 18:
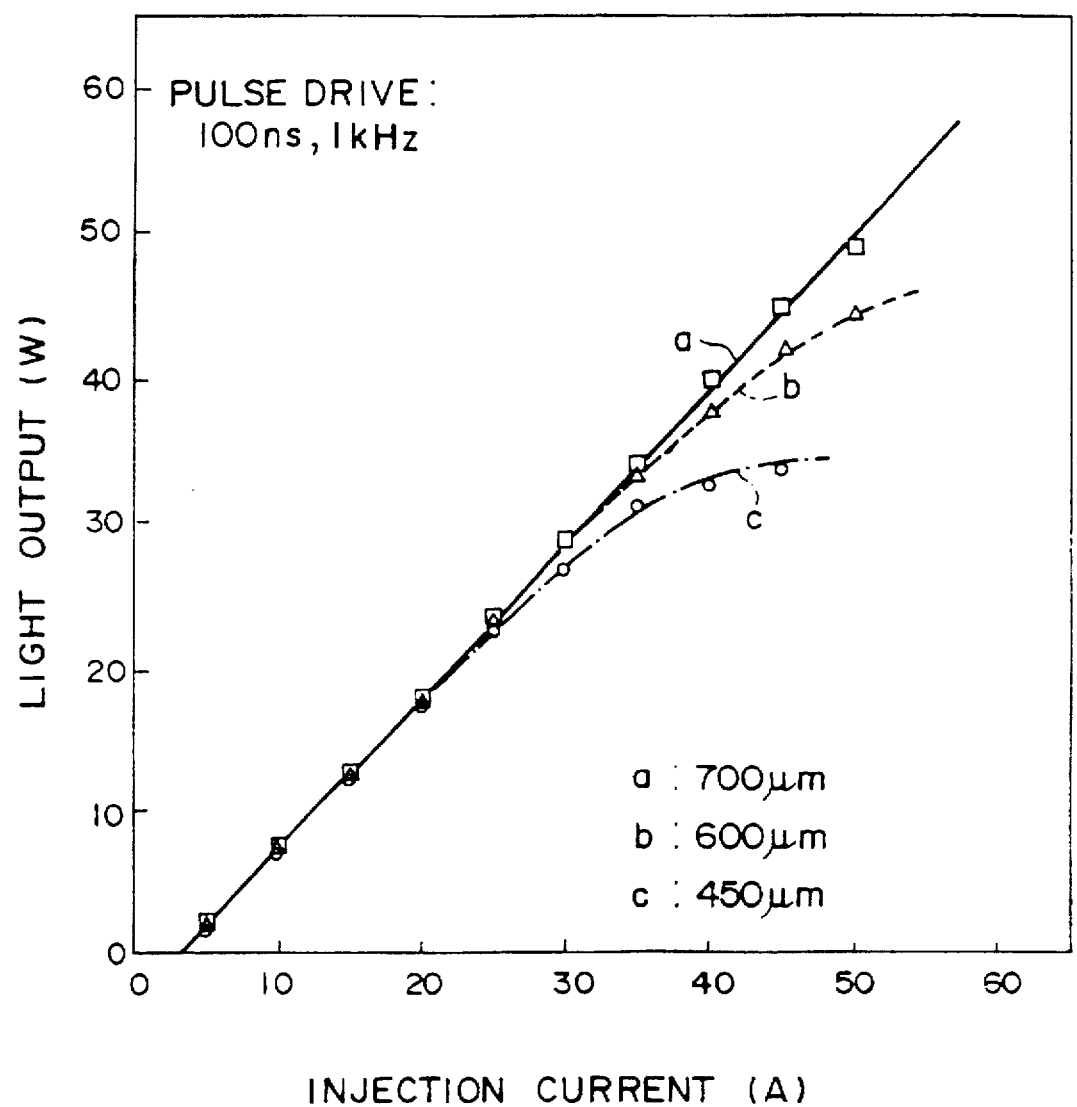
FIG. 18 is a graph showing the relationship between I-L characteristic and resonator length, with I-L characteristic curves obtained for the semiconductor laser of FIG. 12 and the comparative semiconductor laser.

An I-L characteristic used to prove this finding is shown in FIG. 18, where injection current is plotted along the axis of abscissas and light output along the axis of ordinates. Three different resonator lengths L were examined in these experiments.

Lines a, b, and c indicate the I-L characteristics obtained when L is 700 μm, 600 μm, and 450 μm, respectively.

FIG. 18 shows that a good linear relationship is obtained for the I-L characteristic when the resonator length is 700 μm, and thus a high light output is obtained even when a large current is injected. When the resonator length is 600 μm, the light output drops slightly in the high current injection region, but such a drop hardly affects the use of the laser in practice. However, it is clear that when the resonator length is 450 μm, outside the range of the present invention, the light output decreases dramatically in the high current injection region, making the laser unsuitable for practical use.

The reflectance of the first reflective layer 120 is preferably between 0.1% and 5%. If the reflectance is less than 0.1%, the lasing threshold current cannot be passed. If the reflectance exceeds 5%, the external differential quantum efficiency drops, and therefore it is impossible to obtain a high light output. The reflectance of the second reflective layer 121 is preferably at least 98.5%. If the reflectance is less than 98.5%, the lasing threshold current rises, and therefore it is impossible to obtain a high light output.

The reflectance of the first reflective layer 120 may be decreased by a single-layer coating of a dielectric film having a thickness of λ/4n (λ: lasing wavelength, n: refractive index of dielectric), or by coating two pairs of a combination of two dielectric films with different refractive indices. In the latter case, it is necessary to deposit the two dielectric films in such a manner that the dielectric film with the larger refractive index is on the inner side, that is, on the edge surface of the semiconductor layers, and the dielectric film with the smaller refractive index is on the outer side thereof. Dielectric materials used to configure the first reflective layer 120, film thicknesses, numbers of films (or numbers of pairs of films), and reflectances are listed in Table 2. Table 2 shows that many of the reflective layers formed of combinations of dielectric films of different refractive indices, deposited in two pairs of layers, have much smaller reflectances than reflective layers formed of single layers of dielectric film.

TABLE 2

| Thin Dielectric Films (First Film/Second Film) | Film Thickness (nm) | Number of Films/Pairs | Reflectance (Measured %) |
| --- | --- | --- | --- |
| $Al_2O_3$ | 139.4 | 1 Film | 3 |

TABLE 2-continued

| Thin Dielectric Films (First Film/Second Film) | Film Thickness (nm) | Number of Films/Pairs | Reflectance (Measured %) |
| --- | --- | --- | --- |
| MgO | 126.5 | 1 Film | 2 |
| ZrTiOx | 107.5 | 1 Film | 1 |
| Ta$_2$O$_5$ | 97.7 | 1 Film | 3 |
| SiNx | 107.5 | 1 Film | 1.5 |
| TiOx | 93.5 | 1 Film | 4 |
| ZrOx/SiOx | 107.5/ 148.3 | 2 Pairs | 0.2 |
| SiNx/SiOx | 107.5/ 148.3 | 2 Pairs | 0.5 |
| Ta$_2$O$_5$/SiOx | 97.7/ 148.3 | 2 Pairs | 4 |
| Ta$_2$O$_5$/Al$_2$O$_3$ | 97.7/ 143.3 | 2 Pairs | 0.5 |
| TiOx/Al$_2$O$_3$ | 93.5/ 143.3 | 2 Pairs | 2 |

The second reflective layer 121 is formed of dielectric films of different refractive indices deposited alternately, and each dielectric film has film thickness of λ/4n. In this case, in contrast to the first reflective layer 120, the dielectric film with the smaller refractive index should be formed closer to the semiconductor-layer side than the dielectric film with the larger refractive index. The dielectric materials, film thicknesses, numbers of pairs, and reflectances of dielectric films used to configure the second reflective layer 121 are listed in Table 3. Table 3 shows that most of these reflective layers have high reflectances of at least 99%.

TABLE 3

| Thin Dielectric Films (First Film/Second Film) | Film Thickness (nm) | Number of Pairs | Reflectance (Measured %) |
| --- | --- | --- | --- |
| SiOx/ZrOx | 148.3/ 107.5 | 9 | 99.4 |
| SiOx/ZrTiOx | 148.3/ 107.5 | 9 | 99.4 |
| SiOx/Ta$_2$O$_5$ | 148.3/ 97.7 | 7 | 99.6 |
| SiOx/TiOx | 148.3/ 93.8 | 7 | 99.7 |
| SiOx/a-Si | 148.3/ 63.2 | 4 | 98.7 |
| SiOx/SiNx | 148.3/ 107.5 | 9 | 98.2 |
| Al$_2$O$_3$/Ta$_2$O$_5$ | 134.4/ 97.7 | 8 | 99.2 |

Figure 19:
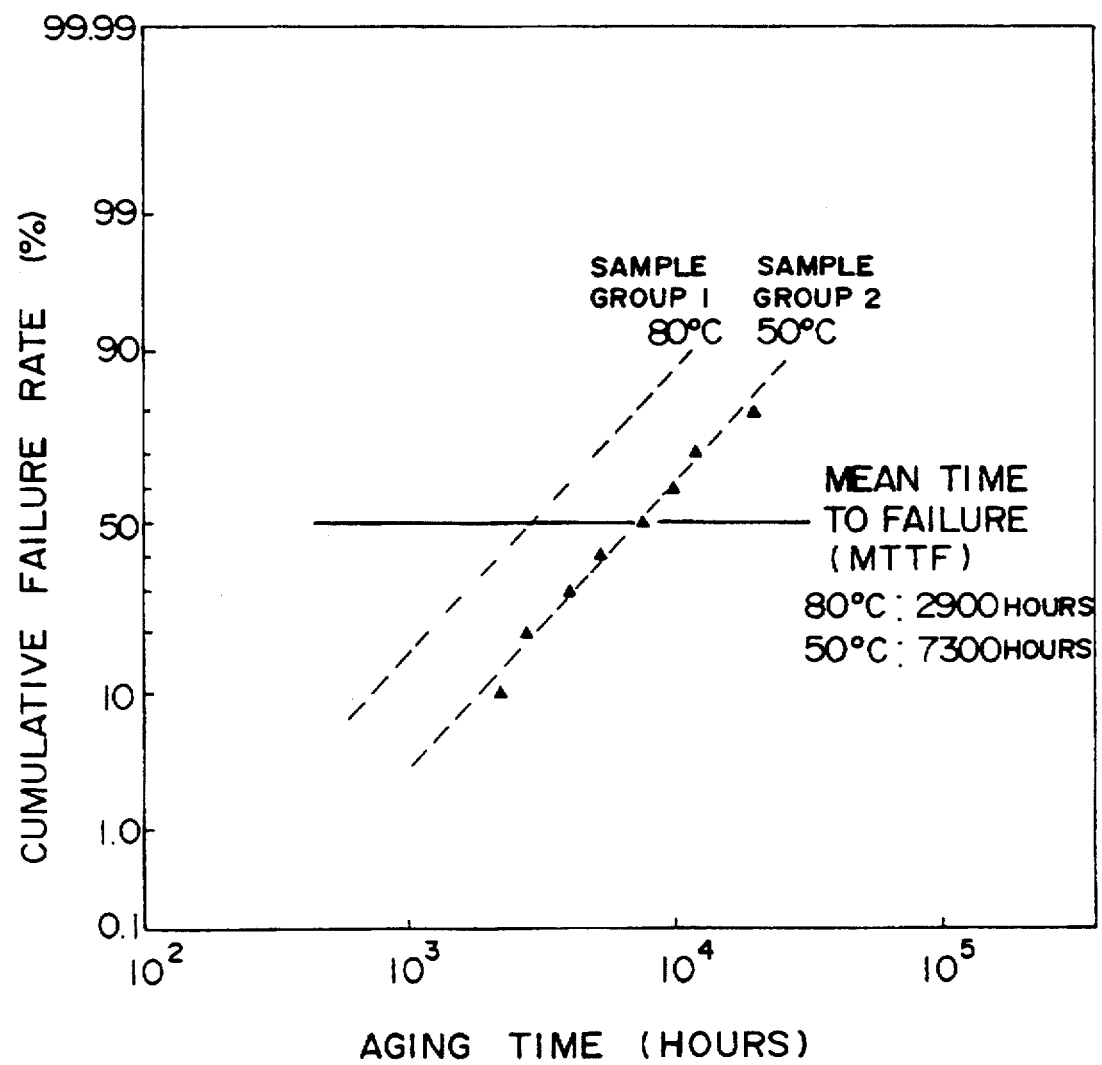
FIG. 19 is a graph showing the relationship between aging time and cumulative failure rate, obtained for the semiconductor laser of FIG. 12.

The results of aging tests performed on semiconductor laser in accordance with this embodiment are shown in FIG. 19. In this figure, aging time is plotted along the axis of abscissas and cumulative failure rate along the axis of ordinates. In this case, "aging time" indicates continuous time during which the semiconductor laser is powered and driven and "cumulative failure rate" is the proportion of failures within the same sample group.

The aging tests were performed by preparing a large number of semiconductor lasers having the configuration of this embodiment, and which were fabricated in the same manner from the same wafer, and dividing them into two sample groups. The semiconductor lasers in sample group 1 were held at a package temperature (ambient temperature) of 80° C. and those in sample group 2 were held at 50° C. All the semiconductor lasers were driven continuously, and any changes in the laser beam output were measured. The drive conditions for both sample groups 1 and 2 were a constant-current drive at 40 A with pulses of 100 ns at 1 kHz. Failure was determined to be a general failure of a semiconductor laser in which the light output falls to 90% or less of the initial light output (light output at the start of aging), and failure time was taken to be the time taken from the start of aging until failure.

Figure 20:
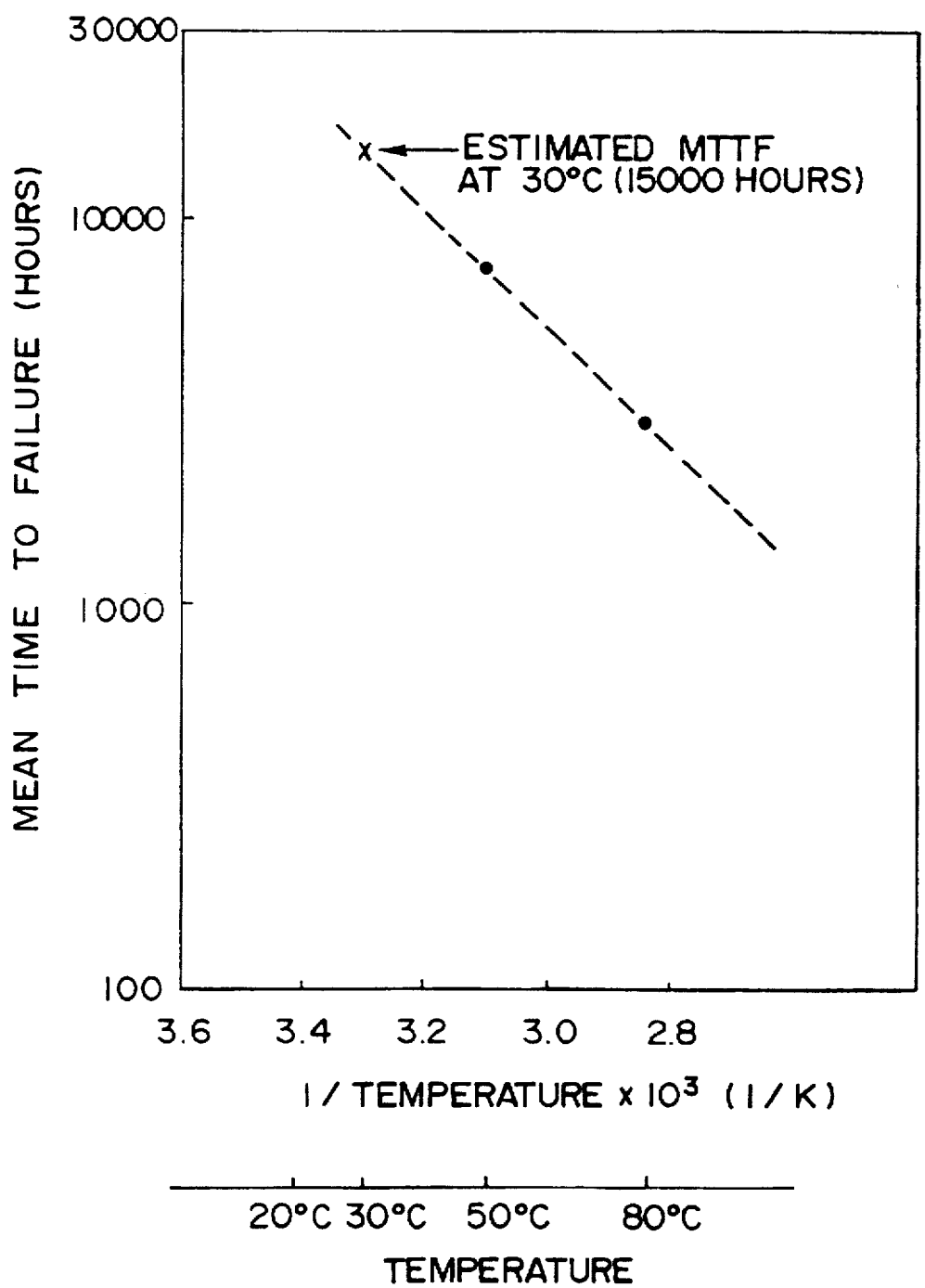
FIG. 20 is a graph showing the relationship between the reciprocal of temperature and the mean time to failure, obtained for the semiconductor laser of FIG. 12.

It is clear from FIG. 19 that the trend in cumulative failure rate was roughly the same for both sample group 1 and sample group 2, both sample groups had the same deterioration mode, but the failure time was dependent on the difference in temperature energy. When the mean time to failure (MTTF: the time taken for half the testpieces in the sample group to fail, in other words, the time taken for the cumulative failure rate to reach 50%) was obtained, it was 2900 hours at a package temperature of 80° C. and 7300 hours at 50° C. Since the effect of temperature energy is generally inversely proportional to temperature (1/temperature), the relationship between the reciprocal of temperature and mean time to failure was obtained by using the above described results, to give the results shown in FIG. 20. In this figure, the reciprocal of temperature is plotted along the axis of abscissas and mean time to failure is plotted along the axis of ordinates. It can be seen from FIG. 20 a mean time to failure of approximately 15,000 hours is obtained at operating temperature (30° C.).

When an ordinary semiconductor laser (a low-power one) is used, a guaranteed mean time to failure (operating temperature: 30° C.) of at least 10,000 hours is required. Thus it is clear that the use of a configuration with a flat active layer in accordance with this invention provides a high-power semiconductor laser that is not inferior to an ordinary semiconductor laser in the mean time to failure, even though it has wide stripes and a long resonator length.

An example of the method of fabricating the semiconductor laser of this embodiment will now be described.

AlGaAs-type semiconductor layer stack SL (see FIG. 12) comprising the n-type buffer layer 102, n-type first cladding layer 103, n-type first optical waveguide layer 104, active layer 105, p-type second optical waveguide layer 106, p-type second cladding layer 107, and p-type contact layer 108 are grown epitaxially in sequence on the n-type GaAs substrate 101 by metal organic chemical vapor deposition (MOCVD). The film-formation conditions could be, for example, a growth temperature of 680° C. to 800° C., a growth pressure of 50 Torr to 200 Torr (26,660 Pa), an organic metal such as trimethyl gallium (TMGa) or trimethyl aluminum (TMAl) used as a Group-III element, a hydride such as arsine (AsH$_3$) used as a Group-V element, H$_2$Se used as an n-type dopant, and diethyl zinc (DEZn) used as a p-type dopant.

The conditions governing the Al composition, film thickness, and dopant of each of the various layers configuring the AlGaAs-type semiconductor layer stack are as laid out in Table 1.

In this case, the n-type substrate 101 is a flat substrate that has a roughness that does not exceed ±0.05 μm within a unit area of 1 mm×1 mm. Roughness means the height or depth of any convex or concave portion with respect to a reference surface which is assumed to be at the substrate 101 and whose height corresponds to the average thickness within a unit area of the substrate 101. Before the semiconductor layers are formed, it is preferable that the surface of the substrate is washed without deteriorating the flatness thereof, by etching while agitating the substrate sufficiently in an etchant of H$_2$SO$_4$, H$_2$O$_2$, and H$_2$O in the ratios of 5:1:1. It is possible to restrict the roughness of the semiconductor layers to be no more than ±0.02 μm within a unit area of 1 mm×1 mm by modulating the gas flow rate during the MOCVD in an optimal manner. Thus the roughness of the entire substrate and the semiconductor layers below the active layer can be limited to be no more than ±0.07 μm. Research conducted by the inventors has proved that the roughness of the active layer 105 can be held to no more than ±0.1 μm by restricting the roughness of the semiconductor layers below the active layer to no more than ±0.05 μm.

After the AlGaAs-type semiconductor layer stack has been grown, an insulating film is deposited by chemical vapor deposition (CVD) on the contact layer 108. In this embodiment, $SiO_2$ is used as the insulating film. This insulating film is patterned by popular photolithography and etching techniques to form the current constriction layer 109 having the stripe-shaped current injection region 112 in the central portion thereof.

The n-side ohmic electrode 111 and p-side ohmic electrode 110 are then vapor-deposited on the other surface of the substrate 101 and the surface of the current constriction layer 109 and of the current injection region 112 respectively. Subsequently, alloying is performed for 30 to 120 seconds at, for example, 350° to 450° C. in nitrogen or hydrogen atmosphere.

The dielectric films forming the first reflective layer 120 and second reflective layer 121 are then formed by electron beam deposition. In other words, wafers that have been achieved through the foregoing process and cut into bar form are first stacked in such a manner that dielectric films can be formed only on the cleavage planes thereof, which are edge surfaces of the semiconductor lasers. This stack is placed in a vapor deposition chamber which is evacuated to a degree of vacuum of no more than $5 \times 10^{-6}$ Torr ($6.67 \times 10^{-4}$ Pa), and the bar-shaped wafers are heated to a temperature between 100° and 250° C. The electron-beam current is adjusted so that the rate of deposition is between 0.1 to 1 nm/second to form the dielectric layers.

The semiconductor laser 100 obtained in the above manner is a gain-waveguide type of semiconductor laser having a configuration with a single wide stripe. The semiconductor laser of this embodiment has structural features such as an active layer of a multiple quantum-well structure with a good flatness, cladding layers with Al compositions set within a specific range, a large resonator length of 500 μm to 1,000 μm, and a wide current injection region of 100 μm to 250 μm. Further, the semiconductor laser 100 is capable of lasing with a single peak pattern at a wavelength of 860 nm and at a maximum light output of 50 W, while maintaining a wide lasing region of approximately 100 μm to 250 μm.

Figure 21:
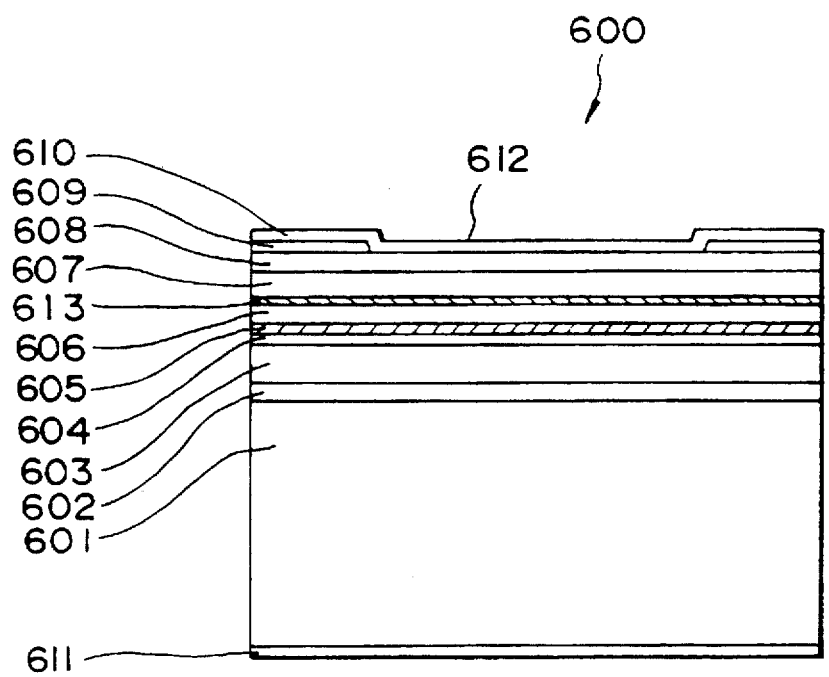
FIG. 21 is a schematic vertical sectional view through another example of a semiconductor laser that can be applied to this invention.

A sectional view diagrammatically showing a semiconductor laser of another embodiment of the present invention is shown in FIG. 21.

A semiconductor laser 600 of this embodiment differs from the above described semiconductor laser 100 in the two points discussed below. First of all, a blocking layer 613 is interposed between a second optical waveguide layer 606 and a second cladding layer 607 in order to prevent any overflow of carriers. Secondly, the Al composition of first and second cladding layers 603 and 607 is as low as 0.20 to 0.40. The rest of the structure, that is, a GaAs substrate 601, a buffer layer 602, a first optical waveguide layer 604, an active layer 605, a second optical waveguide layer 606, a contact layer 608, a current constriction layer 609, electrodes 610 and 611, and reflective layers on the edge surfaces of the semiconductor layers (not shown in the figure) are basically the same as those in the semiconductor laser 100, and therefore detailed description thereof is omitted. Details of the Al composition, film thickness, and dopant of each of the semiconductor layers of the semiconductor laser 600 of this embodiment are given in Table 4.

TABLE 4

|  | Al Composition | Film Thickness (μm) | Dopant |
| --- | --- | --- | --- |
| Buffer layer 602 | 0 | 0.5–1.5 (0.5) | Se |
| First cladding layer 603 | 0.20–0.40 (0.25) | 0.5–1.5 (1.0) | Se |
| First optical waveguide layer 604 | 0.15–0.30 (0.20) | 0.1–0.2 (0.15) | none |
| Active layer 605 | — | 0.043–0.098 (0.075) | — |
| Well layer 605a | 0 | 0.007–0.012 (0.010) | none |
| Barrier layer 605b | 0.15–0.25 (0.20) | 0.003–0.010 (0.007) | none |
| Second optical waveguide layer 606 | 0.15–0.30 (0.20) | 0.2–0.6 (0.55) | Zn |
| Blocking layer 613 | 0.30–0.60 (0.40) | 0.008–0.020 (0.010) | Zn |
| Second cladding layer 607 | 0.20–0.40 (0.25) | 0.5–1.5 (1.0) | Zn |
| Contact layer 608 | 0 | 0.2–0.8 (0.6) | Zn |

In the semiconductor laser 600, the formation of the blocking layer 613 prevents injected carriers from overflowing, without having to increase the Al composition of the cladding layers 603 and 607. In other words, the overflow of injected carriers is prevented in the semiconductor 100 by setting the Al composition of the cladding layers 103 and 107 to within a comparatively large specific range. However, increasing the Al composition of the cladding layers increases the optical confinement factor, which raises two points to be considered. First of all, the radiation angle in the far-field pattern of the direction perpendicular to the junction direction of the semiconductor layers increases, and thus the difference of the radiation angles between the perpendicular and parallel directions in the far-field pattern also increases, making it rather difficult to design an optical system using this laser as a light-emitting element. The other point is that the light density increases in the light-emitting region in the vicinity of the edge surface, so that the edge surface is susceptible to damage. This second embodiment enables the same good optical lasing as the first embodiment.

The film thickness of the blocking layer 613 is preferably between 8 nm and 20 nm, more preferably between 10 nm and 15 nm, and the Al composition ratio (x) thereof is preferably between 0.30 and 0.60, more preferably between 0.35 and 0.5.

Results obtained by examining characteristics by using the semiconductor laser 600 of this embodiment will next be described. A semiconductor laser of the configuration given in parentheses in the fields of Table 4 was used as a sample in this experiment. The I-L characteristic of this laser is shown in FIG. 22.

Figure 22:
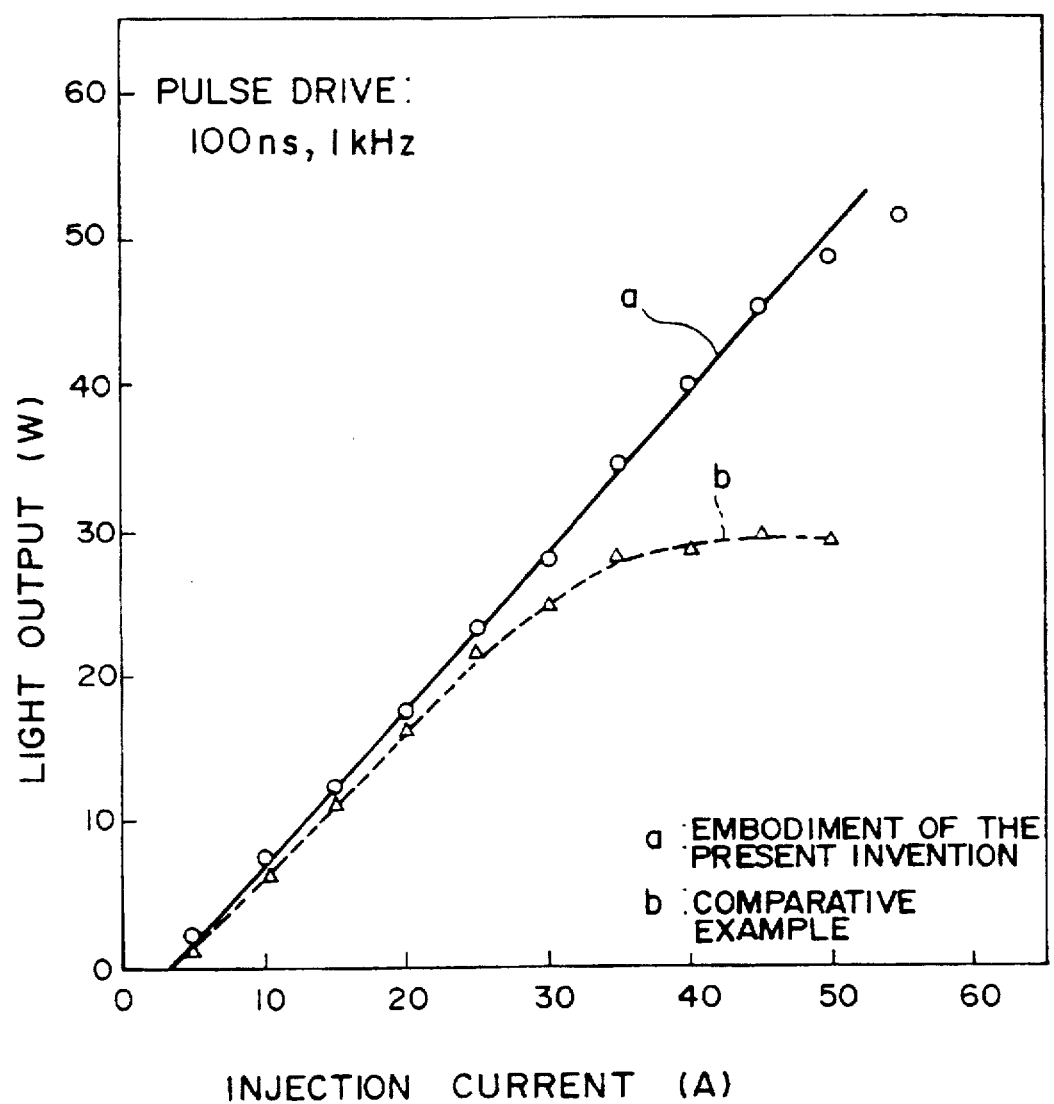
FIG. 22 shows I-L characteristic curves obtained for the semiconductor laser of FIG. 21 and a comparative semiconductor laser.

The line a in FIG. 22 is the I-L characteristic obtained for the semiconductor laser 600 of this embodiment having a blocking layer, and the line b is that obtained for the comparative semiconductor laser (which is also shown by the line b in FIGS. 14 and 15) which does not have a blocking layer but which has layers that are of the same configurations as the layers of the semiconductor laser 100. FIG. 22 shows that linearity is maintained when there is a blocking layer, even if the injection current is high, and that light output saturates when there is no blocking layer.

Temperature characteristics measured in the same manner as described above produced the following result. If the light output at 90° C. is assumed to be ΔT when the light output at 20° C. is taken to be 100, the sample of the semiconductor laser 600 had a ΔT of 70. Since it is clear from the result obtained for the comparative sample shown by the line b of FIG. 15 that the value of ΔT when there is no blocking layer is 20, the interposition of the blocking layer 613 greatly improves the temperature characteristic of the semiconductor laser. The far-field pattern of the sample of the semiconductor laser 600 is 24°, which is the same as that obtained when the blocking layer is not interposed. The semiconductor laser of this embodiment has these favorable light emission characteristics because the blocking layer 613 is so thin that it has no effect on the light in waveguide mode but it prevents any overflow of injected carriers from the active region.

In this above described semiconductor laser 600, the blocking layer 613 was described as being interposed between the second optical waveguide layer 606 and the second cladding layer 607, but the present invention is not limited thereto. The blocking layer can be interposed between the first cladding layer 603 and the first optical waveguide layer 604, or between both the first cladding layer 603 and the first optical waveguide layer 604 and the second cladding layer 607 and the second optical waveguide layer 606.

The semiconductor laser of the present invention is not limited to the semiconductor lasers 100 and 600 with stripe-shaped electrodes; it is applicable to any other semiconductor laser of a stripe structure such as a planar stripe type or a proton-bombardment stripe type.

It should be noted that although this invention is described herein by way of preferred embodiments, this invention is not limited in any way to these embodiments and it can be modified in various ways within the scope of the invention.

What is claimed is:

1. A light-sensing device comprising:
   a light source including a semiconductor laser;
   a light-transmitting optical system having a lens surface and a diffraction grating surface arranged on the optical axis of light emitted from said light source; and
   a light-receiving detection system that detects any of said emitted light that is reflected from an object to be inspected, wherein said emitted light is diffracted in at least two orthogonal directions by said diffraction grating surface.

2. The light-sensing device as defined in claim 1, wherein said diffraction grating surface is formed of a single diffraction grating.

3. The light-sensing device as defined in claim 2, wherein said diffraction grating surface comprises a first diffraction grating surface formed on one surface of a grating substrate and a second diffraction grating surface formed on the other surface of the grating substrate, each diffraction grating surface has a grating pattern formed of a linear group of ridges and troughs in a single direction, and the direction of said group of ridges and troughs of said first diffraction grating surface is orthogonal to the direction of group of ridges and troughs of said second diffraction grating surface.

4. The light-sensing device as defined in claim 2, wherein said diffraction grating surface is formed on one surface of a grating substrate and said diffraction grating surface has a grating pattern formed of orthogonal linear groups of ridges and troughs.

5. The light-sensing device as defined in claim 2, wherein said diffraction grating surface is formed on one surface of a grating substrate and said diffraction grating surface has a grating pattern formed of a group of concentric curved ridges and troughs.

6. The light-sensing device as defined in claim 5, wherein said grating pattern consists of a group of ridges and troughs in a concentric circular or elliptical shape.

7. The light-sensing device as defined in claim 1, wherein said lens surface and said diffraction grating surface are formed on a single substrate, a refraction lens surface is formed on one surface of said substrate, and a diffraction lens surface comprising a group of ridges and troughs in a concentric circular or elliptical shape is formed on the other surface thereof.

8. The light-sensing device as defined in claim 1, wherein a group of ridges and troughs configuring said diffraction grating surface has a sectional shape that is a saw-tooth pattern.

9. The light-sensing device as defined in claim 1, wherein said semiconductor laser comprises a substrate formed of a compound semiconductor of a first conductivity type, semiconductor layers deposited on one surface of said substrate, a current constriction layer formed on said semiconductor layers and having at least one stripe-shaped current injection region, and a pair of reflective layers formed on edge surfaces of said substrate and said semiconductor layers;

said semiconductor layers comprise:
   a first cladding layer of the first conductivity type positioned on said substrate side,
   a first optical waveguide layer of the first conductivity type formed on said first cladding layer,
   an active layer formed on said first optical waveguide layer and having a quantum-well structure,
   a second optical waveguide layer of a second conductivity type formed on said active layer,
   a second cladding layer of the second conductivity type formed on said second optical waveguide layer, and
   a contact layer of the second conductivity formed on said second cladding layer, and wherein:
   said active layer has flatness of such a degree that roughness with respect to a reference surface within a unit area of 1 mm×1 mm is no more than ±0.1 µm,
   the width of said current injection region of said current constriction layer is between 100 µm and 250 µm, and
   the resonator length is between 500 µm and 1,000 µm.

10. The light-sensing device as defined in claim 9, wherein said semiconductor layers are formed of AlGaAs-type compound semiconductors.

11. The light-sensing device as defined in claim 9, wherein said pair of reflective layers comprise a first reflective layer with a reflectance at the lasing wavelength of 0.1% to 5% and a second reflective layer with a reflectance at the lasing wavelength of at least 98.5%.

12. The light-sensing device as defined in claim 11, wherein said reflective layers are each formed of one or more pairs of two thin dielectric films of differing refractive indices deposited alternately, such that in said first reflective layer a thin dielectric film with a larger refractive index is deposited on the semiconductor-layer side, and in said second reflective layer a thin dielectric film with a smaller refractive index is deposited on the semiconductor-layer side.

13. The light-sensing device as defined in claim 9, wherein said semiconductor layers are formed of AlGaAs-type compound semiconductors, and said active layer comprises well and barrier layers, the value of x in the $Al_xGa_{1-}$ $_x$As of a well layer is 0, the value of x in the Al$_x$Ga$_{1-x}$As of a barrier layer is between 0.15 and 0.25, and the value of x in the Al$_x$Ga$_{1-x}$As of said first and second cladding layers is at least 0.28.

14. The light-sensing device as defined in claim 9, wherein a blocking layer is formed between at least one pair of said first cladding layer and said first optical waveguide layer, and said second cladding layer and said second optical waveguide layer.

15. The light-sensing device as defined in claim 14, wherein said semiconductor layers are formed of AlGaAs-type compound semiconductors, and the value of x in the Al$_x$Ga$_{1-x}$As of said first cladding layer and said second cladding layer is between 0.20 and 0.40.

16. The light-sensing device as defined in claim 14, wherein said semiconductor layers are formed of AlGaAs-type compound semiconductors, and said blocking layer has film thickness of 8 nm to 20 nm, and the value of x in the Al$_x$Ga$_{1-x}$As thereof is 0.30 to 0.60.

17. The light-sensing device as defined in claim 1, wherein said emitted light is diffracted in at least two orthogonal planes by said diffraction grating surface.

* * * * *

UNITED STATES PATENT AND TRADEMARK OFFICE
CERTIFICATE OF CORRECTION

PATENT NO. : 5,760,885
DATED : June 2, 1998
INVENTOR(S) : OSAMU YOKOYAMA

It is certified that error appears in the above-identified patent and that said Letters Patent is hereby corrected as shown below:

In section 30, "Foreign Application Priority Data", for JP 6-310991, change "December 4, 1994" to --December 14, 1994--.

Signed and Sealed this

Sixth Day of October, 1998

Attest:

BRUCE LEHMAN

*Attesting Officer*  *Commissioner of Patents and Trademarks*